(12) United States Patent
    Asakawa

(10) Patent No.: US 10,110,816 B2
(45) Date of Patent: Oct. 23, 2018

(54) OPTICAL UNIT WITH SHAKE CORRECTION FUNCTION

(71) Applicant: NIDEC SANKYO CORPORATION, Suwa-gun, Nagano (JP)

(72) Inventor: Shinroku Asakawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 15/612,431

(22) Filed: Jun. 2, 2017

(65) Prior Publication Data

US 2017/0353663 A1    Dec. 7, 2017

(30) Foreign Application Priority Data

Jun. 2, 2016   (JP) ................................. 2016-110960

(51) Int. Cl.

| | | |
|---|---|---|
| G03B 19/04 | (2006.01) |
| H04N 5/232 | (2006.01) |
| G03B 5/06 | (2006.01) |
| H04N 5/225 | (2006.01) |
| G03B 5/08 | (2006.01) |
| G03B 17/26 | (2006.01) |
| G03B 17/52 | (2006.01) |
| G03B 19/12 | (2006.01) |
| G02B 7/02 | (2006.01) |
| G02B 27/64 | (2006.01) |

(52) U.S. Cl.
CPC ........... *H04N 5/23261* (2013.01); *G03B 5/06* (2013.01); *H04N 5/2251* (2013.01); *H04N 5/2257* (2013.01); *H04N 5/23287* (2013.01); *G02B 7/023* (2013.01); *G02B 27/644* (2013.01); *G03B 5/08* (2013.01); *G03B 17/26* (2013.01); *G03B 17/52* (2013.01); *G03B 19/04* (2013.01); *G03B 19/12* (2013.01); *G03B 2205/0007* (2013.01)

(58) Field of Classification Search
CPC ....................................................... G03B 17/52
USPC ......................................................... 396/363
See application file for complete search history.

(56) References Cited

U.S. PATENT DOCUMENTS

2001/0028516 A1* 10/2001 Noguchi ............. G02B 27/646
                                                                    359/823

FOREIGN PATENT DOCUMENTS

| JP | 2015-082072 | * 10/2013 | ............... G03B 5/00 |
| JP | 2015082072 A | 4/2015 | |

* cited by examiner

*Primary Examiner* — Clayton E Laballe
*Assistant Examiner* — Kevin Butler
(74) *Attorney, Agent, or Firm* — Cantor Colburn LLP

(57) ABSTRACT

An optical unit with a shake correction function may include a unit with a swing mechanism having an optical module and a swing drive mechanism structured to swing the optical module, a rolling drive mechanism including a magnetic drive mechanism structured to turn the unit with the swing mechanism in a direction different from a swing direction by the swing drive mechanism, a connection member which connects the unit with the swing mechanism with a turning shaft of the rolling drive mechanism, and a support member which supports the rolling drive mechanism. The connection member includes an abutting part integrally turned with the unit with the swing mechanism and the support member includes a position restriction part which restricts a movable range of the abutting part.

17 Claims, 14 Drawing Sheets

FIG. 5A
FIG. 5B
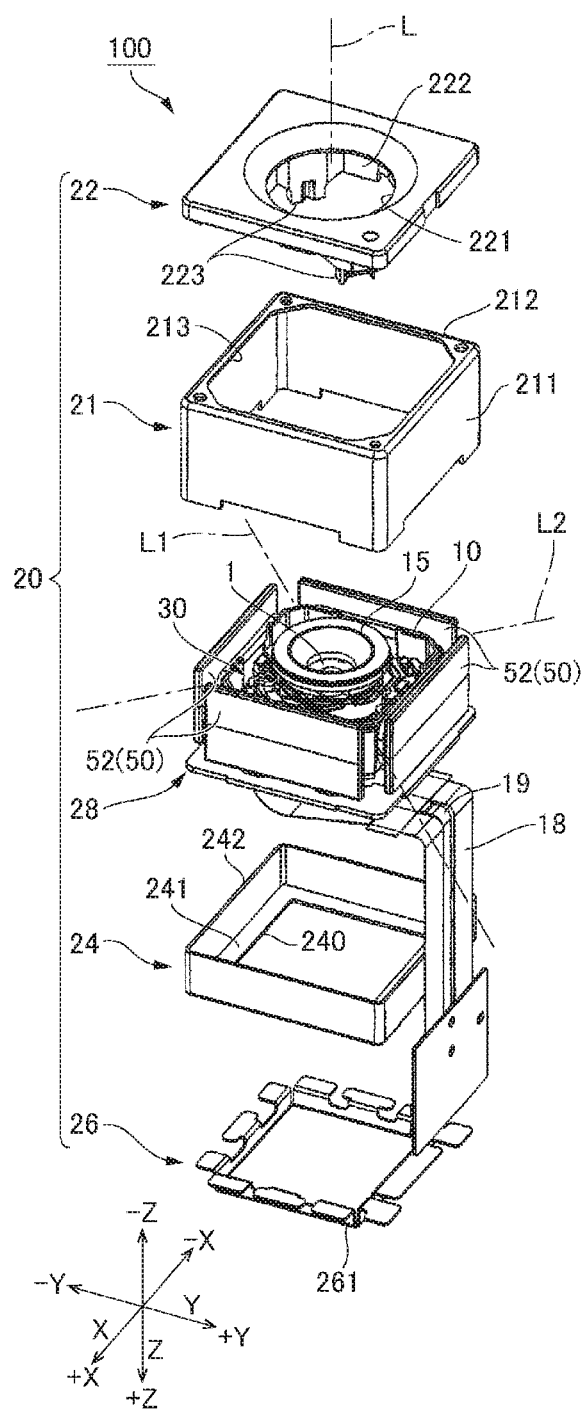
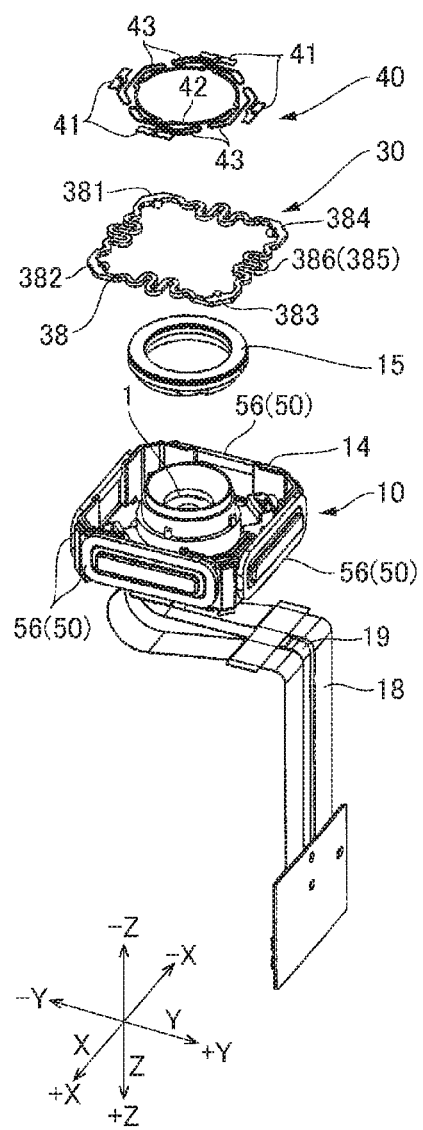

FIG. 7A
FIG. 7B
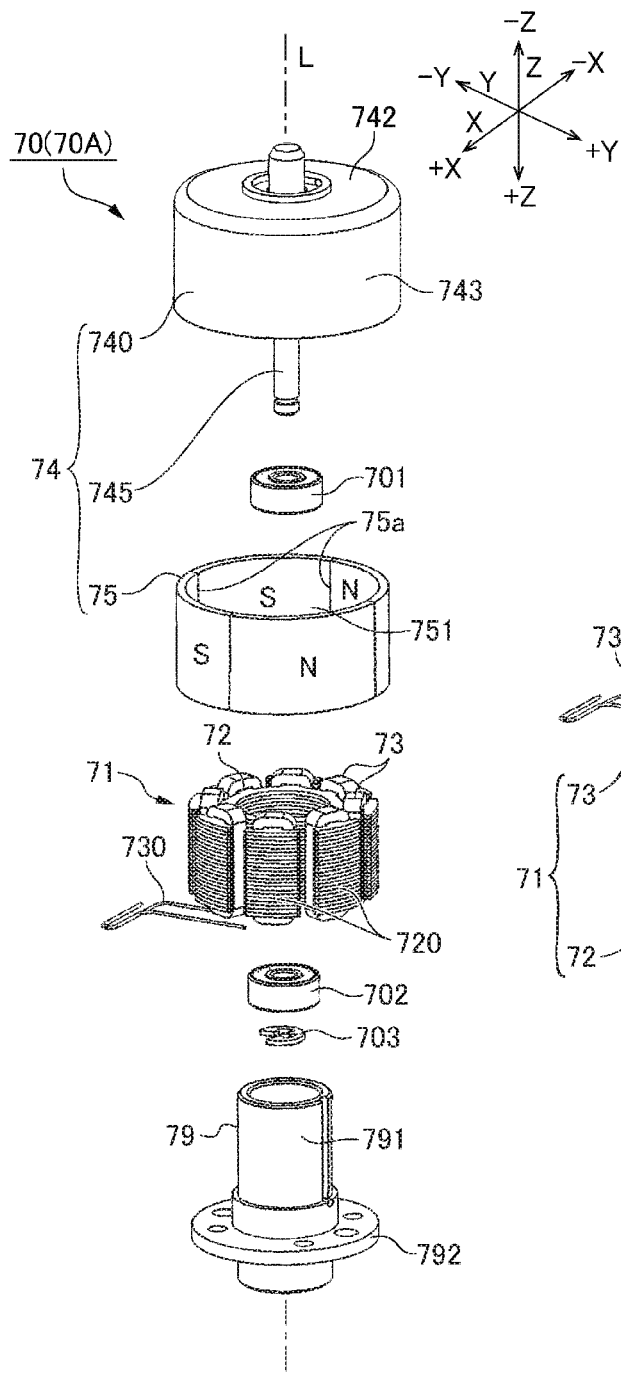
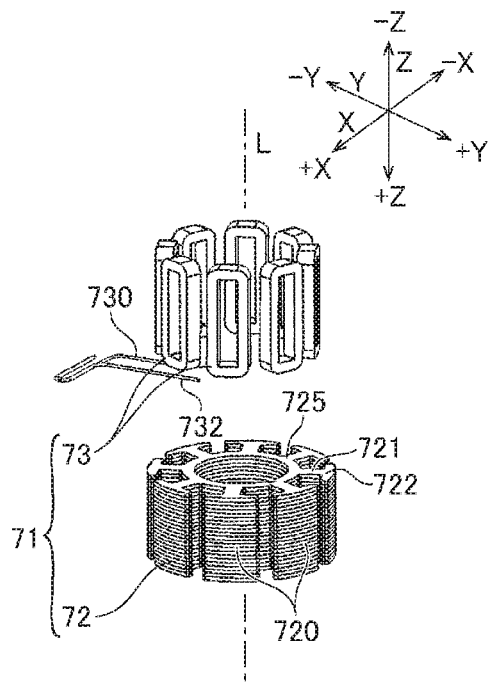

OPTICAL UNIT WITH SHAKE CORRECTION FUNCTION

CROSS REFERENCE TO RELATED APPLICATION

The present invention claims priority under 35 U.S.C. § 119 to Japanese Application No. 2016-110960 filed Jun. 2, 2016, the entire content of which is incorporated herein by reference.

FIELD OF THE INVENTION

At least an embodiment of the present invention may relate to an optical unit with a shake correction function which is mounted on a portable terminal or a movement body.

BACKGROUND

An imaging device which is mounted on a portable terminal or a movement body such as a vehicle and an unmanned helicopter includes an optical unit on which an optical module for photographing is mounted. This type of an optical unit is required to suppress disturbance of a photographed image due to a shake of an imaging device. Therefore, an optical unit with a shake correction function has been proposed which includes a swing drive mechanism structured to swing an optical module in a pitching (vertical swing: tilting) direction and in a yawing (lateral swing: panning) direction and a rolling drive mechanism structured to turn the optical module around an optical axis. This type of an optical unit with a shake correction function is disclosed in Japanese Patent Laid-Open No. 2015-82072.

In an optical unit with a shake correction function, a movable body on which an optical module such as a lens is mounted is swingably supported in a pitching direction and a yawing direction with respect to a fixed body. A stopper mechanism is structured between the fixed body and the movable body for restricting an excessive swing of the movable body. Further, the rolling drive mechanism turns the whole of the unit with a swing mechanism including the movable body, the fixed body and the swing drive mechanism around an optical axis. The unit with a swing mechanism and the rolling drive mechanism are accommodated into a unit case together with a circuit board on which a control circuit is mounted, a wiring board and the like.

In a case that a stopper mechanism for restricting a movable range in a rolling direction of the optical module is to be provided, it is conceivable that a stopper mechanism is provided between the unit with a swing mechanism having the optical module and a unit case. According to this structure, when the unit with a swing mechanism and a rolling drive mechanism are to be assembled in the unit case, assembling positions in a turning direction are required to be adjusted. However, the stopper mechanism is hidden between the unit case and the unit with a swing mechanism and thus it is difficult to adjust the assembling positions. Further, inspections for characteristic evaluations cannot be performed until the unit with a swing mechanism and the rolling drive mechanism are assembled in the unit case. Therefore, defective products cannot be removed before the unit with a swing mechanism and the rolling drive mechanism are assembled in the unit case.

SUMMARY

In view of the problem described above, at least an embodiment of the present invention may advantageously provide an optical unit with a shake correction function in which an inspection and adjustment of a stopper mechanism for restricting a movable range of an optical module around its optical axis are easily performed.

According to at least an embodiment of the present invention, there may be provided an optical unit with a shake correction function including a unit with a swing mechanism having an optical module swingably supported and a swing drive mechanism structured to swing the optical module, a rolling drive mechanism including a magnetic drive mechanism structured to turn the unit with a swing mechanism in a direction different from a swing direction by the swing drive mechanism, a connection member which connects the unit with a swing mechanism with a turning shaft of the rolling drive mechanism, and a support member which supports the rolling drive mechanism. The connection member includes an abutting part which is integrally turned with the unit with a swing mechanism and the support member includes a position restriction part which restricts a movable range of the abutting part.

In at least an embodiment of the present invention, the stopper mechanism using the abutting part and the position restriction part is structured between the support member which supports the rolling drive mechanism and the connection member which connects the unit with a swing mechanism with the turning shaft of the rolling drive mechanism. According to this structure, the optical module can be prevented from being excessively turned by a force applied from the outside. Further, the abutting part and the position restriction part function as the stopper mechanism in a state that the assembled body has been structured by assembling the unit with a swing mechanism having the optical module, the rolling drive mechanism, the connection member and the support member. Therefore, before these mechanisms are assembled into the unit case, an inspection can be performed in a state of the assembled body to eliminate a defective product. Further, a movable range of the optical module can be adjusted in a state that the stopper mechanism is located at an open position, the movable range of the optical module can be adjusted with a high degree of accuracy.

In at least an embodiment of the present invention, in a case that two directions perpendicular to an axial line direction of the turning shaft are referred to as a first direction and a second direction, the support member is provided with at least one side plate part located in at least one direction on both sides in the first direction and on both sides in the second direction of the rolling drive mechanism, and the position restriction part is provided in the side plate part provided at a position corresponding to the abutting part. According to this structure, the stopper mechanism is structured by utilizing the side plate part located on an outer peripheral side of the rolling drive mechanism. Therefore, assembling work is easily performed. Further, the stopper mechanism can be structured by utilizing a side plate part which protects the rolling drive mechanism.

In at least an embodiment of the present invention, the side plate part is formed in a flat plate shape. According to this structure, when the support member is to be attached to another member such as the unit case, the side plate part can be used as an attaching part.

In at least an embodiment of the present invention, the abutting part is one of a protruded part and a recessed part provided in the connection member, and the position restriction part is a cut-out part or a projection which is provided in an edge of the side plate part and is engageable with the protruded part or the recessed part as the abutting part. According to this structure, the protruded part is disposed in the cut-out part and a movable range of the protruded part can be restricted by edges of the cut-out part. Alternatively, the projection provided in the side plate part is disposed in the recessed part provided in the connection member, and a movable range of the recessed part of the connection member can be restricted by the projection provided in the side plate part. Therefore, a movable range of the unit with a swing mechanism provided with the optical module can be confirmed easily through the connection member and thus, the stopper mechanism which can be easily assembled and adjusted is structured.

In at least an embodiment of the present invention, the connection member includes a holding part which holds the unit with a swing mechanism, the holding part is provided with a bottom plate part and a frame part protruding from the bottom plate part to a side of the unit with a swing mechanism, the unit with a swing mechanism is disposed on an inner side of the frame part, and the abutting part is integrally provided in the frame part. According to this structure, a movable range of the unit with a swing mechanism can be restricted by using the connection member which holds the unit with a swing mechanism, and the movable range can be confirmed easily and the stopper mechanism which can be easily assembled and adjusted is structured.

In at least an embodiment of the present invention, the magnetic drive mechanism of the rolling drive mechanism is a single phase motor, and the single phase motor includes a turning shaft as the turning shaft of the rolling drive mechanism which is turnably supported by a bearing held by a bearing holder, a rotor which is attached to the turning shaft, and a stator which is held by the bearing holder. The support member is provided with a bottom plate part to which the bearing holder is fixed and the side plate part which is bent from the bottom plate part, and an end face of the side plate part is provided with the position restriction part which is capable of abutting with the abutting part integrally provided in the frame part. According to this structure, a movable range of the unit with a swing mechanism can be restricted by the support member to which the single phase motor that is the magnetic drive mechanism of the rolling drive mechanism is attached, and the movable range can be confirmed easily and the stopper mechanism which can be easily assembled and adjusted is structured.

In at least an embodiment of the present invention, the optical unit further includes a control part structured to control the unit with a swing mechanism, and the unit with a swing mechanism is located on one side in an axial line direction of the turning shaft with respect to the rolling drive mechanism, and the control part is located on the other side, and the unit with a swing mechanism and the control part are connected with each other through a flexible circuit board. According to this structure, the flexible circuit board can be extended along the side plate part and thus contacting of the rolling drive mechanism with the flexible circuit board can be avoided. Further, the side plate part can be disposed between the flexible circuit board and the magnetic drive mechanism. Therefore, for example, when the support member is structured of magnetic material, a signal passing through the flexible circuit board may be hard to be affected by magnetic noise generated from the rolling drive mechanism which is provided with the magnetic drive mechanism.

In at least an embodiment of the present invention, at least one of a portion of the abutting part which is capable of abutting with the position restriction part and a portion of the position restriction part which is capable of abutting with the abutting part is made of resin. According to this structure, a contact noise when the abutting part and the position restriction part are abutted with each other can be reduced.

In at least an embodiment of the present invention, the magnetic drive mechanism is a single phase motor. The single phase motor utilizes an attraction force and a repulsive force by the rotor magnet and thus, in comparison with a case that Lorentz force is utilized, a large torque can be obtained. In this case, it may be structured that the single phase motor is an outer rotor type single phase motor, and the number of salient poles of a stator core of the single phase motor is two times of the number of magnetic poles of the rotor magnet.

In at least an embodiment of the present invention, the single phase motor is structured to reciprocatedly turn the unit with a swing mechanism within an angular range interposed by adjacent two peak points of a cogging torque with a stable point as a center. According to this structure, the single phase motor is not required to apply a torque exceeding a ripple of the cogging torque to the unit with a swing mechanism on which the optical module is mounted. Therefore, power saving of the single phase motor can be attained. Further, the cogging torque applied to the unit with a swing mechanism on which the optical module is mounted can be utilized as a magnetic spring for returning the unit with a swing mechanism to a reference position around the optical axis. Therefore, a mechanical spring is not required to provide separately.

In at least an embodiment of the present invention, the connection member is provided with a hole or a recessed part into which the turning shaft is inserted, and the connection member is fixed to the turning shaft by a screw attached to a screw hole which is opened to an inner peripheral face of the hole or the recessed part. According to this structure, an attaching position of the connection member with respect to the turning shaft can be easily adjusted. In this case, specifically, it may be structured that the connection member is provided with a holding part which holds the unit with a swing mechanism, the holding part is provided with a bottom plate part, a frame part which is protruded from the bottom plate part to a side of the unit with a swing mechanism, and a cylindrical tube part which is protruded from the bottom plate part to a side of the turning shaft, the unit with a swing mechanism is disposed on an inner side of the frame part, the cylindrical tube part is provided with the hole or the recessed part into which the turning shaft is inserted, and the cylindrical tube part is provided with the abutting part.

In at least an embodiment of the present invention, the optical unit further includes a unit case which accommodates the unit with a swing mechanism, the connection member, the rolling drive mechanism and the support member, and an assembled body which is structured by assembling the rolling drive mechanism, the unit with a swing mechanism, the connection member and the support member is fixed to the unit case through the support member. According to this structure, an assembled body which is structured by assembling the unit with a swing mechanism having the optical module, the rolling drive mechanism, the connection member and the support member is completed and inspected and, after that, the assembled body can be fixed to the unit case through the support member. Therefore, the internal mechanisms of the optical unit with a shake correction function can be easily assembled in the unit case.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are exploded perspective views showing a unit with a swing mechanism which is viewed from an object side.

FIGS. 7A and 7B are exploded perspective views showing a rolling drive mechanism.

DETAILED DESCRIPTION

An embodiment of an optical unit with a shake correction function to which the present invention is applied will be described below with reference to the accompanying drawings. In this specification, three directions perpendicular to each other are respectively set in an "X"-axis direction, a "Y"-axis direction and a "Z"-axis direction. The "X"-axis direction is a first direction, and one side in the "X"-axis direction is referred to as a "+X" direction and the other side is referred to as a "−X" direction. Further, the "Y"-axis direction is a second direction, and one side in the "Y"-axis direction is referred to as a "+Y" direction and the other side is referred to as a "−Y" direction. The "Z"-axis direction is a direction along an optical axis "L" of an optical module 1 (optical axis of a lens), and one side (image side) in the "Z"-axis direction is referred to as a "+Z" direction and the other side (object side) is referred to as a "−Z" direction.

(Entire Structure)

Figure 1:
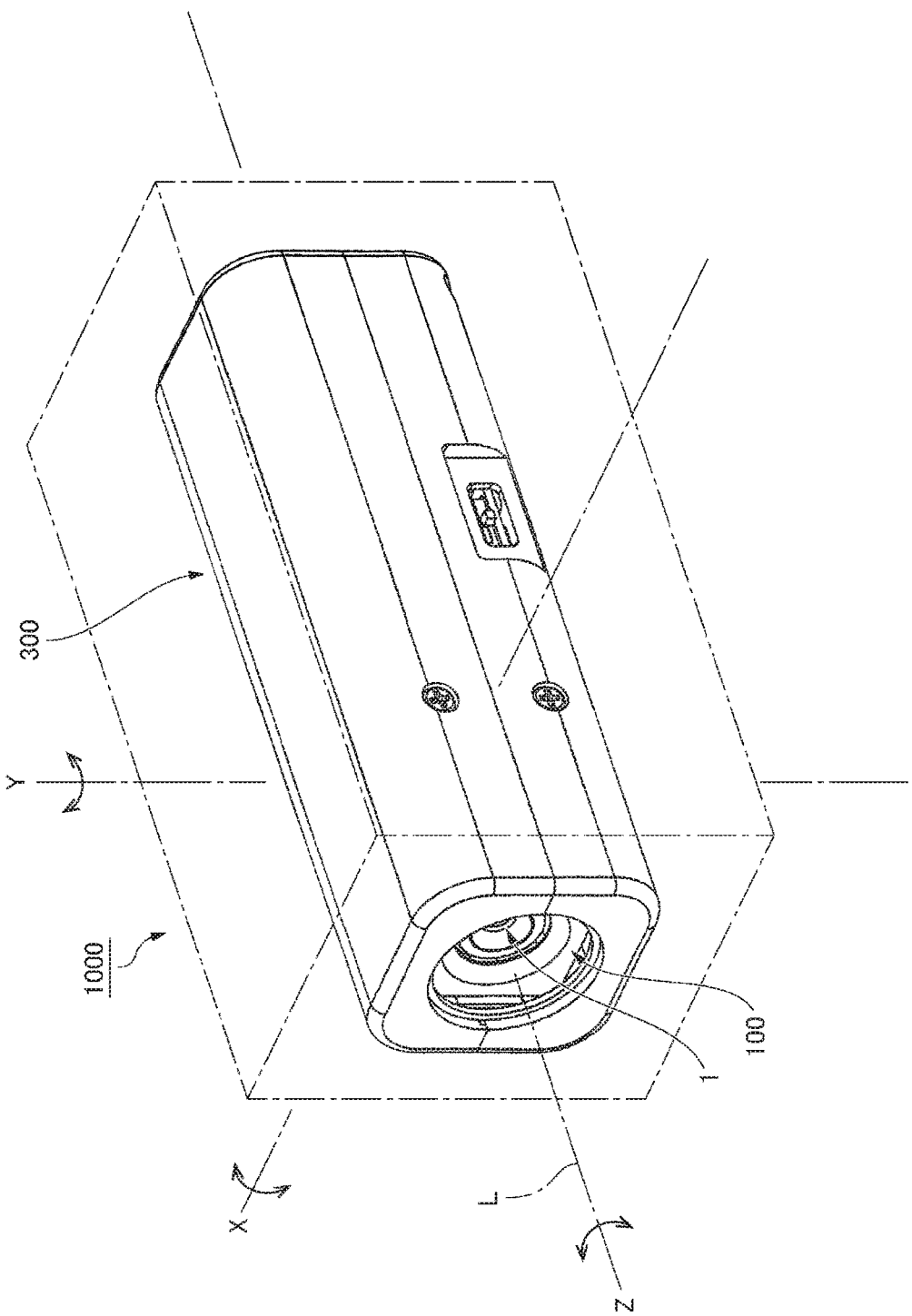
FIG. 1 is an explanatory view schematically showing an optical device on which an optical unit with a shake correction function to which the present invention is applied is mounted.

FIG. 1 is an explanatory view schematically showing an optical device 1000 on which an optical unit 300 with a shake correction function to which the present invention is applied is mounted. The optical unit 300 with a shake correction function is mounted on an optical device 1000 such as an imaging device mounted on a portable terminal, a drive recorder and an unmanned helicopter. The optical unit 300 with a shake correction function includes an optical module 1. Regarding shakes of the optical module 1, turning around the "X"-axis corresponds to pitching (vertical swing), turning around the "Y"-axis corresponds to yawing (lateral swing), and turning around the "Z"-axis corresponds to rolling.

When a shake or the like is occurred in the optical device 1000 at a time of photographing, disturbance occurs in a photographed image of the optical unit 300. The optical unit 300 with a shake correction function includes a movable body 10 (see FIGS. 5A and 5B and FIG. 6) which holds an optical module 1, and a swing drive mechanism 50 (see FIGS. 5A and 5B and FIG. 6) structured to swing the movable body 10 around two axes ("X"-axis and "Y"-axis) perpendicular to the optical axis "L" to correct pitching and yawing. Further, the optical unit 300 with a shake correction function includes a rolling drive mechanism 70 (see FIGS. 2 through 4) structured to turn a unit 100 with a swing mechanism provided with the movable body 10 and the swing drive mechanism 50 around the "Z"-axis (around the optical axis "L") to correct rolling. When a shake is detected by a gyroscope or the like, the optical unit 300 with a shake correction function drives the swing drive mechanism 50 and the rolling drive mechanism 70 to perform a shake correction.

(Optical Unit with Shake Correction Function)

Figure 2:
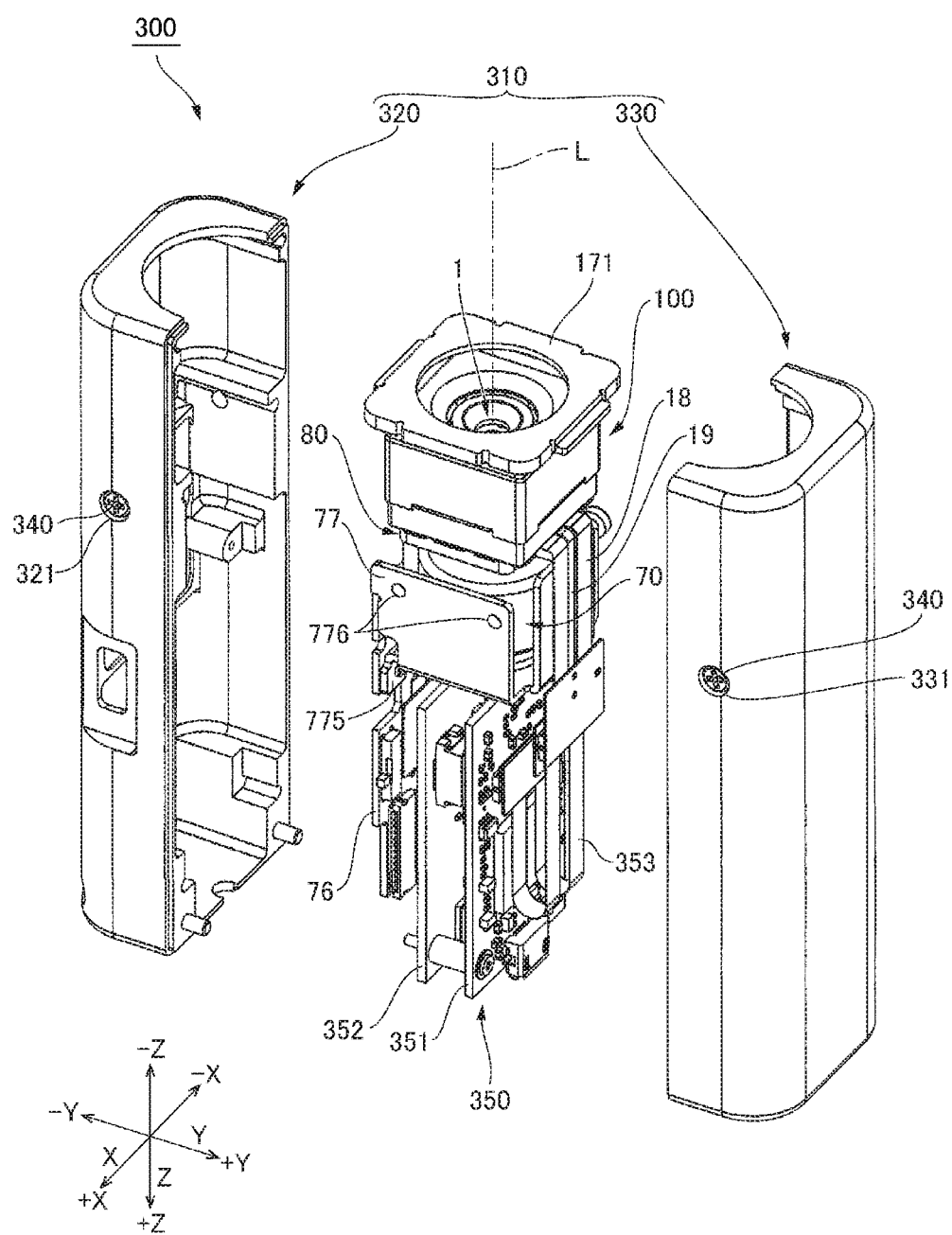
FIG. 2 is an exploded perspective view showing an optical unit with a shake correction function.
Figure 3:
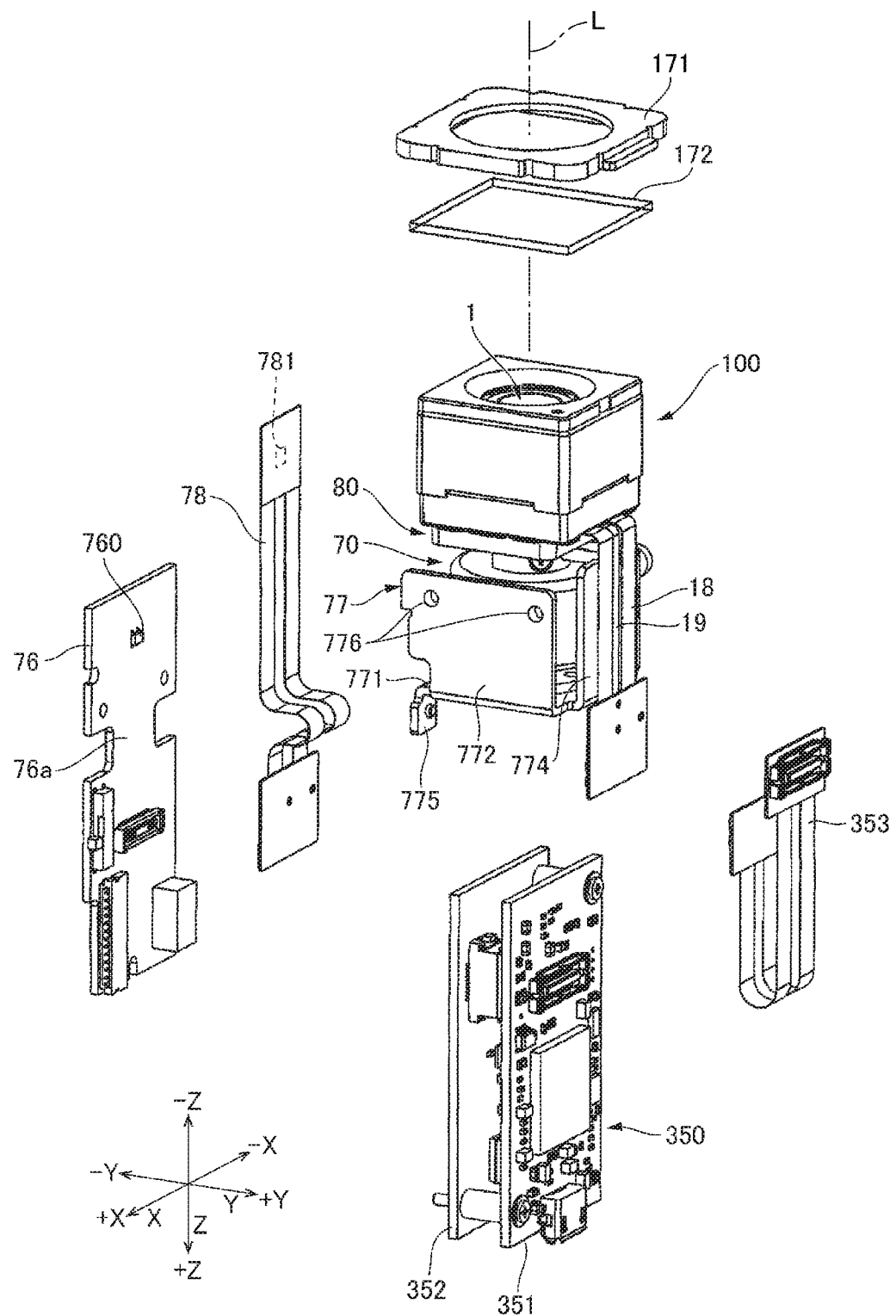
FIG. 3 is an exploded perspective view showing internal mechanisms of an optical unit with a shake correction function.
Figure 4:
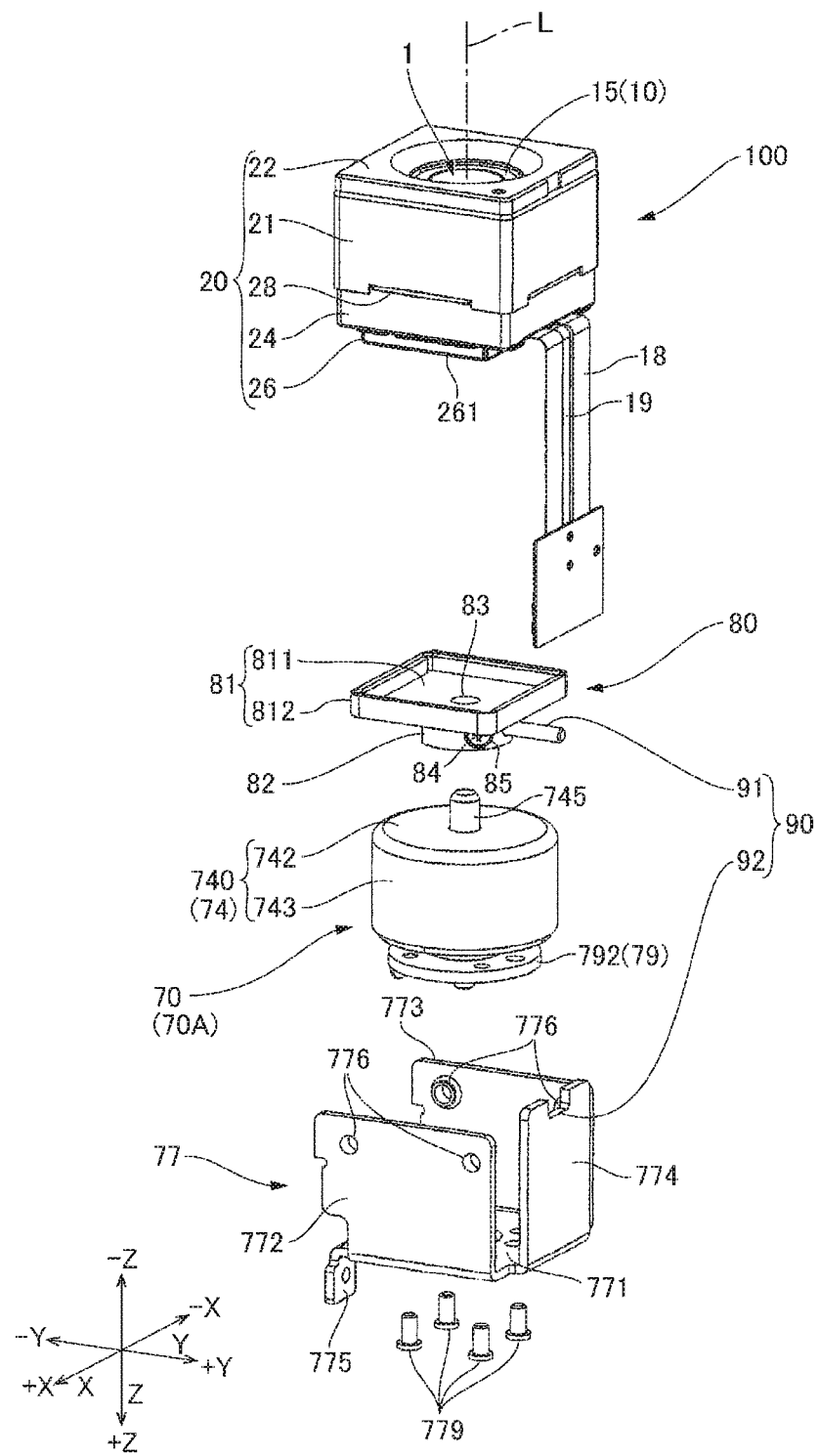
FIG. 4 is an exploded perspective view showing a unit with a swing mechanism, a connection member, a rolling drive mechanism and a support member.

FIG. 2 is an exploded perspective view showing the optical unit 300 with a shake correction function. FIG. 3 is an exploded perspective view showing internal mechanisms of the optical unit 300 with a shake correction function. FIG. 4 is an exploded perspective view showing a unit 100 with a swing mechanism, a connection member 80, a rolling drive mechanism 70 and a support member 77.

As shown in FIG. 2, the optical unit 300 with a shake correction function includes a unit case 310 which is extended in the "Z" direction. As shown in FIGS. 2 and 3, a control part 350, the rolling drive mechanism 70 and the unit 100 with a swing mechanism are disposed in this order from one side "+Z" toward the other side "−Z" in the "Z" direction in an inside of the unit case 310. The rolling drive mechanism 70 is fixed to the unit case 310 through a support member 77. Further, the unit 100 with a swing mechanism is connected with the rolling drive mechanism 70 through a connection member 80. The unit case 310 is provided with a first case member 320 and a second case member 330. The first case member 320 and the second case member 330 are respectively fixed to the support member 77 of the rolling drive mechanism 70 by screws 340. In other words, the support member 77 of the rolling drive mechanism 70 is fixed to the first case member 320 and the second case member 330 by the screws 340 and the support member 77 serves as a fixing part of the rolling drive mechanism 70 and the unit 100 with a swing mechanism with respect to the unit case 310 of the optical unit 300 with a shake correction function. The first case member 320 and the second case member 330 cover the control part 350, the rolling drive mechanism 70 and the unit 100 with a swing mechanism from both sides in the "Y"-axis direction.

As shown in FIGS. 2 and 3, a spacer 171 is held at an end part of the unit case 310 on the other side "−Z" in the "Z"-axis direction so as to cover the unit 100 with a swing mechanism. A cover glass 172 is disposed between the spacer 171 and the unit 100 with a swing mechanism.

The control part 350 includes a first circuit board 351 on which a connector, an IC and the like are mounted, and a second circuit board 352 structured to input and output signals from and to the outside. The first circuit board 351 is connected with the unit 100 with a swing mechanism through flexible circuit boards 18, 19 and 353. Further, the optical unit 300 with a shake correction function includes a circuit board 76 on which a control circuit for the rolling drive mechanism 70 is mounted. The circuit board 76 is connected with the unit 100 with a swing mechanism through a flexible circuit board 78. A gyroscope 781 structured to detect a shake around the optical axis "L" (rolling) of the unit 100 with a swing mechanism is mounted on one side end part of the flexible circuit board 78 which is fixed to the unit 100 with a swing mechanism.

(Unit 100 with Swing Mechanism)

Figure 6:
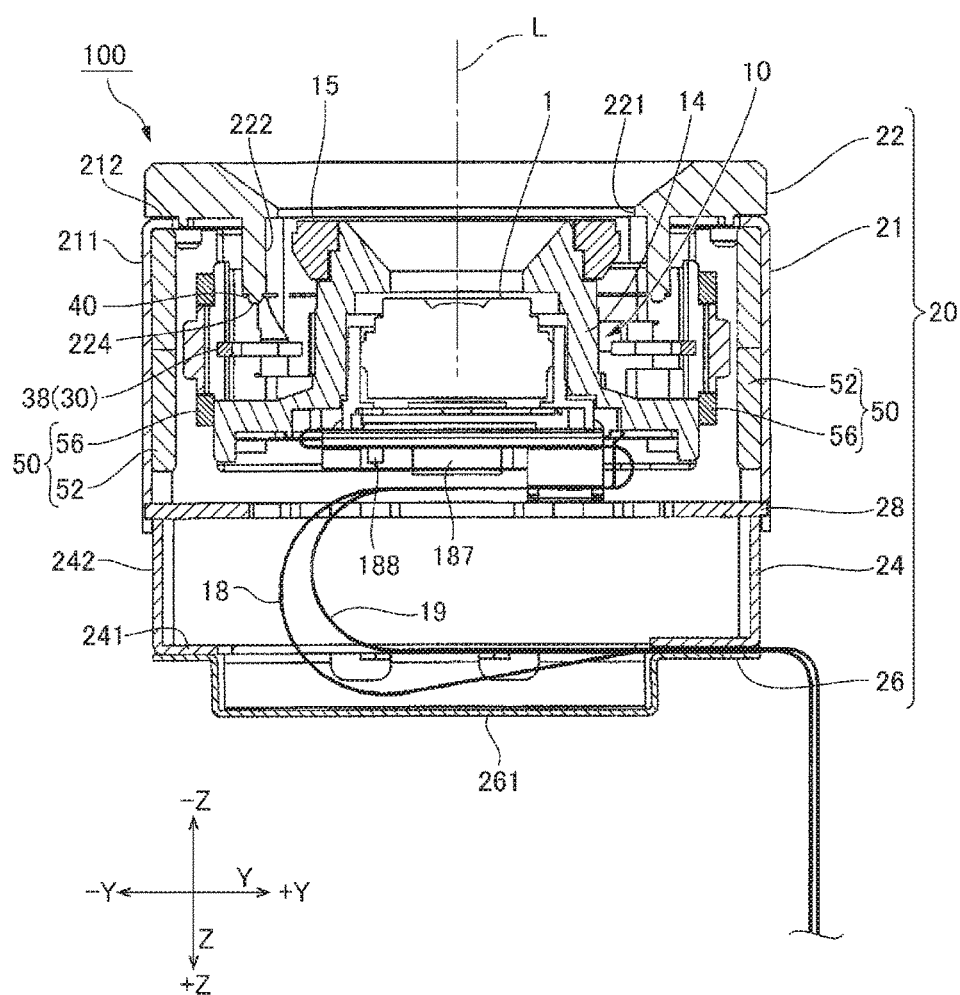
FIG. 6 is a cross-sectional view showing a unit with a swing mechanism.

FIGS. 5A and 5B are exploded perspective views showing the unit 100 with a swing mechanism which is viewed from an object side. FIG. 5A is an exploded perspective view showing the whole of the unit 100 with a swing mechanism and FIG. 5B is an exploded perspective view showing the movable body 10. Further, FIG. 6 is a cross-sectional view showing the unit 100 with a swing mechanism. As shown in FIGS. 5A and 6, the unit 100 with a swing mechanism includes a support body 20 having a rectangular outward shape which is formed in a rectangular tube shape, the movable body 10 having the optical module 1, a gimbal mechanism 30 which swingably supports the movable body 10 with respect to the support body 20, and a swing drive mechanism 50 structured between the movable body 10 and the support body 20. The swing drive mechanism 50 swings the movable body 10 around two axial lines (first axial line "L1" and second axial line "L2") perpendicular to the optical axis "L".

The support body 20 includes a module case 21, a fixed frame 22, a first bottom plate 24, a second bottom plate 26, and a plate-shaped stopper 28. The module case 21 is provided with a body part 211 in a rectangular tube shape which surrounds the movable body 10, and an end plate part 212 in a rectangular frame shape which is protruded to an inner side in a radial direction from an end part of the body part 211 on the other side "−Z" in the "Z"-axis direction. A rectangular opening part 213 is formed in the end plate part 212. The fixed frame 22 is fixed to the module case 21 on the other side "−Z" in the "Z"-axis direction. The fixed frame 22 is formed with an opening part 221 for guiding light from an object to be photographed to the optical module 1.

The first bottom plate 24 is attached to the module case 21 on one side "+Z" in the "Z"-axis direction. The first bottom plate 24 is provided with a rectangular bottom plate part 241 and a side plate part 242 which is protruded from an outer side edge of the bottom plate part 241 toward the other side "−Z" in the "Z"-axis direction. The first bottom plate 24 is formed with an opening part 240 for extending the flexible circuit boards 18 and 19 connected with the movable body 10 to the outside. The opening part 240 is covered by the second bottom plate 26 which is overlapped with the first bottom plate 24 from one side "+Z" in the "Z"-axis direction. The second bottom plate 26 is provided with a rectangular protruded part 261 which is protruded to one side "+Z" in the "Z"-axis direction. The plate-shaped stopper 28 is formed in a rectangular frame shape and is disposed so as to surround the movable body 10. The plate-shaped stopper 28 restricts a movable range of the movable body 10 to one side "+Z" in the "Z"-axis direction.

The movable body 10 includes the optical module 1 having an optical element such as a lens, a holder 14 which holds the optical module 1, and a weight 15. A coil 56 is held at end parts on both sides in the "X"-axis direction of the holder 14 and end parts on both sides in the "Y"-axis direction. The holder 14 holds, for example, the lens, a focusing drive actuator, a photographing circuit module having an imaging element and the like. The weight 15 is a nonmagnetic metal component fixed to the holder 14 and is provided for adjusting a gravity center position in the optical axis "L" direction of the movable body 10.

The movable body 10 is connected with a flexible circuit board 18 structured to output a signal obtained in the photographing circuit module. A gyroscope 187 and an electronic component 188 are mounted on a portion of the flexible circuit board 18 which is overlapped with the holder 14. The flexible circuit board 18 is extended from the movable body 10 and is curved at a plurality of positions and then led out to the outside of the support body 20. Further, the movable body 10 is connected with a flexible circuit board 19 structured to supply electric power to the coils 56. The flexible circuit boards 18 and 19 are connected with a flexible circuit board 353 through a connector which is mounted on a tip end part of the flexible circuit board 18.

The swing drive mechanism 50 is a magnetic drive mechanism including plate-shaped magnets 52 and coils 56. The coils 56 are held by the holder 14 of the movable body 10 and the magnets 52 are held by an inner face of the body part 211 of the module case 21 of the support body 20. The magnet 52 is magnetized so that poles of its outer face side and its inner face side are different from each other. Further, the magnet 52 is divided into two pieces in the optical axis "L" direction and is magnetized so that magnetic poles located on the coil 56 side are different from each other in the optical axis "L" direction. Therefore, upper and lower long side portions of the coil 56 are utilized as effective sides. The module case 21 is structured of magnetic material and functions as a yoke for the magnets 52.

A gimbal mechanism 30 is structured between the movable body 10 and the support body 20. The gimbal mechanism 30 swingably supports the movable body 10 around the first axial line "L1" and swingably supports the movable body 10 around the second axial line "L2" intersecting the first axial line "L1". In this embodiment, the first axial line "L1" and the second axial line "L2" are directions which are inclined by 45 degrees with respect to the "X"-axis direction and the "Y"-axis direction. The gimbal mechanism 30 swingably supports the movable body 10 around the "X"-axis direction and around the "Y"-axis direction by combining swings around the first axial line "L1" and around the second axial line "L2".

As shown in FIG. 5B, in order to structure the gimbal mechanism 30, a rectangular movable frame 38 is disposed between the fixed frame 22 of the support body 20 and the holder 14. The fixed frame 22 is provided with the support part 222 which is protruded toward one side "+Z" in the "Z"-axis direction from an outer peripheral side with respect to the opening part 221. Support plate parts 223 are formed at diagonal positions of the support part 222 in a direction where the first axial line "L1" is extended.

The movable frame 38 is formed in a rectangular shape having four corner parts 381, 382, 383 and 384 around the optical axis "L". In four corner parts 381, 382, 383 and 384, two corner parts 381 and 383 located at diagonal positions in the direction where the first axial line "L1" is extended are swingably supported by the support plate parts 223 of the fixed frame 22 through spherical bodies (not shown) or the like. Further, two corner parts 382 and 384 located at diagonal positions in a direction where the second axial line "L2" is extended swingably support the holder 14 of the movable body 10 through spherical bodies (not shown) or the like. The movable frame 38 is structured of metal material having elasticity or the like. Each of connecting parts 385 which connect four corner parts 381, 382, 383 and 384 is provided with a meandering part 386 which is curved in a direction perpendicular to each extending direction and the "Z"-axis direction. Therefore, the movable frame 38 has elasticity so as not to be resiliently bent to a lower side by the own weight of the movable body 10 but capable of absorbing an impact applied from the outside.

A plate-shaped spring 40 is disposed between the fixed frame 22 and the holder 14. The plate-shaped spring 40 is connected with the movable body 10 and the fixed frame 22 of the support body 20 and restricts a posture of the movable body 10 when the swing drive mechanism 50 is set in a stopped state. The plate-shaped spring 40 is a spring member which is formed in a predetermined shape by processing a metal plate. The plate-shaped spring 40 is provided with fixed body side connection parts 41 formed in its outer peripheral part, a movable body side connection part 42 in a circular ring shape which is formed in its inner peripheral part, and plate spring parts 43 connecting the fixed body side connection parts 41 with the movable body side connection part 42. The fixed body side connection part 41 is fixed to the protruded part 224 (see FIG. 6) which is protruded to one side "+Z" in the "Z"-axis direction from the support part 222 of the fixed frame 22. The movable body side connection part 42 is fixed to the holder 14 by welding, adhesion or the like.

(Pitching Correction and Yawing Correction)

When the optical device 1000 shown in FIG. 1 is swung in a pitching direction and a yawing direction, the swing is detected by the gyroscope 187 and the swing drive mechanism 50 is controlled on the basis of the detected result. In other words, a drive current is supplied to the coils 56 so that the swing detected by the gyroscope 187 is canceled. As a result, the movable body 10 is swung around the first axial line "L1" in an opposite direction to the swing and is swung around the second axial line "L2" in an opposite direction to the swing and thereby the swings in the pitching direction and the yawing direction are corrected.

(Rolling Drive Mechanism)

Figure 8A:
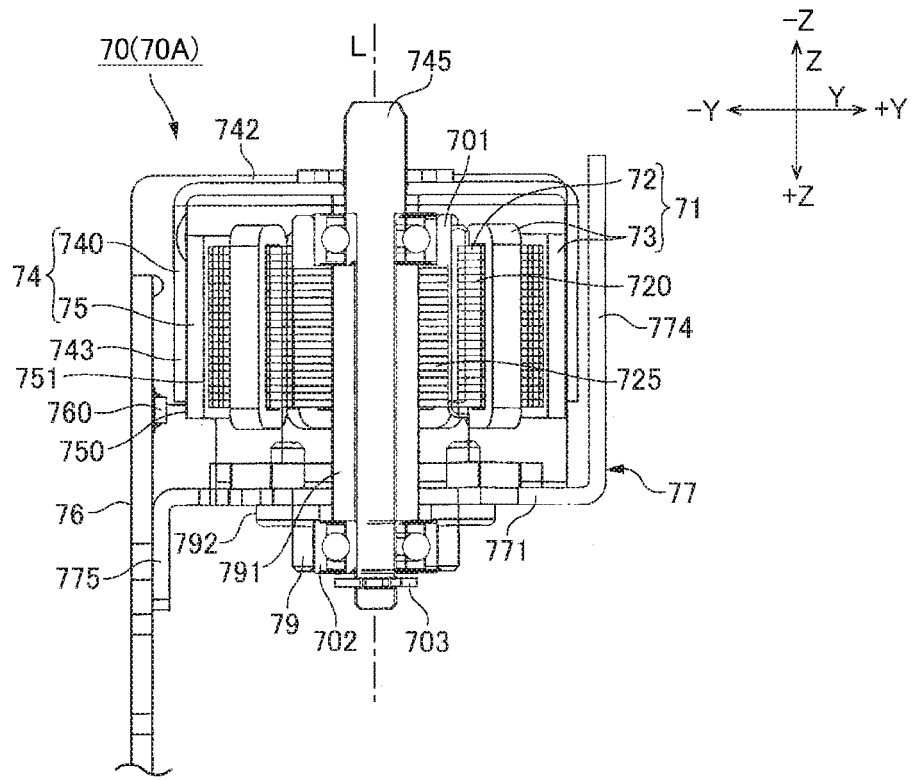
FIGS. 8A and 8B are cross-sectional views showing a rolling drive mechanism.
Figure 8B:
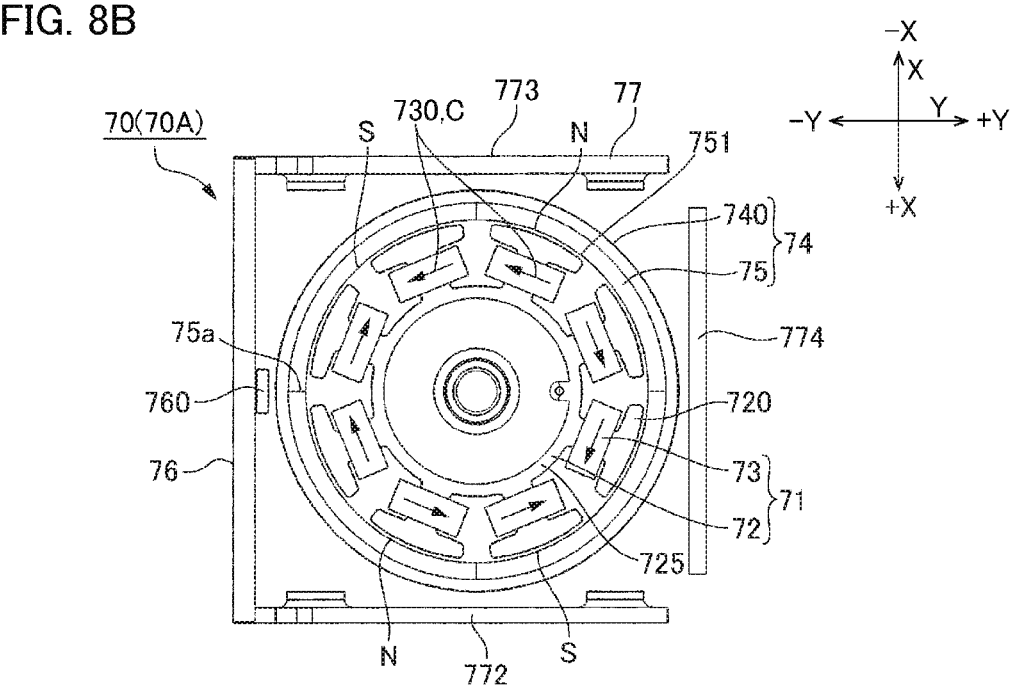

FIGS. 7A and 7B are exploded perspective views showing the rolling drive mechanism 70. FIG. 7A is an exploded perspective view showing the whole of the rolling drive mechanism 70 and FIG. 7B is an exploded perspective view showing a stator 71. FIGS. 8A and 8B are cross-sectional views showing the rolling drive mechanism 70. FIG. 8A is a "YZ" cross-sectional view showing the rolling drive mechanism 70 and FIG. 8B is an "XY" cross-sectional view showing the rolling drive mechanism 70. The rolling drive mechanism 70 turns the unit 100 with a swing mechanism in a direction different from the swing directions by the swing drive mechanism 50. As shown in FIG. 4, in the optical unit 300 with a shake correction function, the optical module 100 with a swing mechanism is supported by a rotor 74 of the rolling drive mechanism 70 disposed on one side "+Z" in the "Z"-axis direction through a connection member 80. The rolling drive mechanism 70 turns the whole of the optical module 100 with a swing mechanism in both directions around the optical axis "L" over a predetermined angular range based on a detected result of the gyroscope 781 shown in FIG. 3 and thereby a rolling correction is performed.

As shown in FIGS. 4 and 7A, the rolling drive mechanism 70 is an outer rotor type single phase motor 70A which includes a stator 71 (see FIG. 7A) held by a support member 77 through a bearing holder 79 and a rotor 74 which is structured to turn around the optical axis "L". In other words, an axial center of a turning shaft 745 which is a turning center of the rotor 74 is coincided with the optical axis "L". As shown in FIGS. 7A and 7B, the stator 71 includes a stator core 72 provided with a plurality of salient poles 720 in a circumferential direction and stator coils 73 wound around the plurality of the salient poles 720. The salient pole 720 is provided with an arm part 721 protruded from a circular ring-shaped part 725 of the stator core 72 to an outer side in a radial direction and a tip end part 722 protruded from an end part on an outer side in the radial direction of the arm part 721 to both sides in a circumferential direction. The stator coil 73 is wound around the arm part 721.

The rotor 74 includes a rotor case 740 in a cup shape and a turning shaft 745 fixed to an end plate part 742 of the rotor case 740. The rotor 74 includes a rotor magnet 75 which is held by an inner face of a cylindrical shaped body part 743 of the rotor case 740. The rotor magnet 75 faces the salient poles 720 on an outer side in the radial direction. An inner peripheral face of the rotor magnet 75 facing the salient poles 720 is a magnetized face 751 on which an "S"-pole and an "N"-pole are alternately magnetized in a circumferential direction with equal angular intervals. The body part 743 of the rotor case 740 is a back yoke for the rotor magnet 75.

The turning shaft 745 is turnably supported by bearings 701 and 702 at positions separated in the "Z"-axis direction. The bearings 701 and 702 are held by the bearing holder 79. The bearing holder 79 is also used as a core holder which holds the stator core 72, and the stator core 72 is fitted to an outer side in the radial direction of a cylindrical tube part 791 of the bearing holder 79. Therefore, the stator 71 is held by the bearing holder 79. A snap ring 703 is attached to an end part on one side "+Z" in the "Z"-axis direction of the turning shaft 745.

The bearing holder 79 is provided with a flange part 792 in a circular plate shape at a position adjacent to the cylindrical tube part 791 on one side "+Z" in the "Z"-axis direction. The flange part 792 is fixed to the support member 77 by screws 779 (see FIG. 4). In this manner, the rolling drive mechanism 70 (single phase motor 70A) is fixed to the support member 77.

The support member 77 is provided with a rectangular bottom plate part 771 to which the flange part 792 of the bearing holder 79 is fixed, a pair of side plate parts 772 and 773 which are bent from end parts on both sides in the "X"-axis direction of the bottom plate part 771 to the other side "−Z" in the "Z"-axis direction, and a side plate part 774 which is bent from an end part on one side "+Y" in the "Y"-axis direction of the bottom plate part 771 to the other side "−Z" in the "Z"-axis direction. The side plate parts 772, 773 and 774 are formed in a flat plate shape and are extended in a direction along the turning shaft 745 of the rotor 74 ("Z"-axis direction and the optical axis "L" direction). The side plate parts 772 and 773 are located on both sides in the "X"-axis direction (first direction) of the rolling drive mechanism 70 (single phase motor 70A), and the side plate part 774 is located on one side "+Y" in the "Y"-axis direction (second direction) of the rolling drive mechanism 70 (single phase motor 70A). The side plate parts 772, 773 and 774 face the body part 743 of the rotor case 740 on an outer side in the radial direction and function as protection plates for the rotor 74.

As shown in FIG. 2, the flexible circuit boards 18 and 19 which connect the control part 350 with the unit 100 with a swing mechanism are extended to one side "+Z" in the "Z"-axis direction along the side plate part 774 of the support member 77. The side plate part 774 is disposed between the flexible circuit boards 18 and 19 and the rolling drive mechanism 70.

The support member 77 is provided with a pair of connecting plate parts 775 (see FIGS. 3 and 12) which are bent from both ends of an end part on the other side "−Y" in the "Y"-axis direction of the bottom plate part 771 toward one side "+Z" in the "Z"-axis direction. A circuit board 76 fixed to the connecting plate parts 775 is disposed on the other side "−Y" in the "Y"-axis direction of the rolling drive mechanism 70 (single phase motor 70A) and the support member 77. The circuit board 76 faces the body part 743 of the rotor case 740 on an outer side in the radial direction and functions as a protection plate for protecting the rotor 74. No side plate part is provided between the circuit board 76 and the rotor case 740 and thus end parts of the coil wire 730 (see FIGS. 7A and 7B) led out from the stator coil 73 can be easily connected with the circuit board 76.

As shown in FIG. 3, a circuit board face 76a of the circuit board 76 facing the body part 743 of the rotor case 740 is mounted with an angular position detection sensor 760 structured to detect an angular position of the rotor 74. The angular position detection sensor 760 is a Hall element and faces the rotor magnet 75 on an opposite side to the stator core 72. The angular position detection sensor 760 faces a magnetic pole boundary line 75a (see FIGS. 7A and 8B) between an "N"-pole and an "S"-pole of the rotor magnet 75 when the rolling drive mechanism 70 is not driven, in other words, when a swing in a rolling direction is not detected.

As shown in FIG. 8A, the rotor 74 is provided with the body part 743 (back yoke) of the rotor case 740 on an outer side in the radial direction of the rotor magnet 75. However, when viewed from an outer side in the radial direction, the rotor magnet 75 is exposed from an end part of the body part 743 on one side "+Z" in the "Z"-axis direction. Therefore, the angular position detection sensor 760 faces an exposed portion 750 of the rotor magnet 75 on an outer side in the radial direction.

An end part on the other side "−Z" in the "Z"-axis direction of the turning shaft 745 of the rotor 74 is connected with the unit 100 with a swing mechanism through the connection member 80. Therefore, the unit 100 with a swing mechanism is turned together with the turning shaft 745 (rotor 74).

When the optical unit 300 with a shake correction function is swung in a rolling direction, the swing is detected by the gyroscope 781 which is mounted on an end part of the flexible circuit board 78 and is fixed to the unit 100 with a swing mechanism. The control part 350 controls the rolling drive mechanism 70 based on a signal from the gyroscope 781 to perform a rolling correction. In order to perform a rolling correction, a drive current corresponding to a swing amount around the optical axis "L" is supplied to the stator coil 73 and, as a result, the rotor 74, the connection member 80 and the unit 100 with a swing mechanism are turned in a direction opposite to the swing direction around the optical axis "L".

(Movable Range of Rolling Drive Mechanism 70)

Figure 9A:
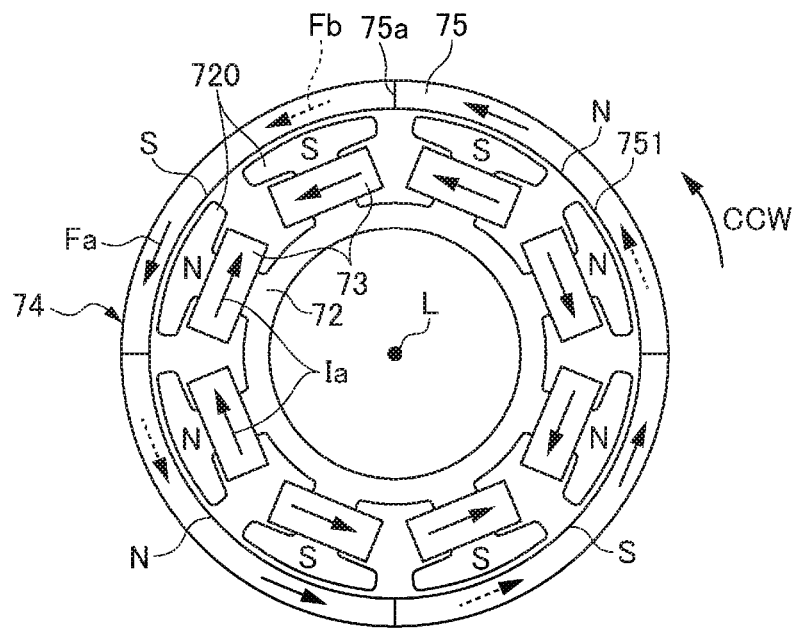
FIGS. 9A and 9B are explanatory views showing an operation of a rolling drive mechanism (single phase motor).
Figure 9B:
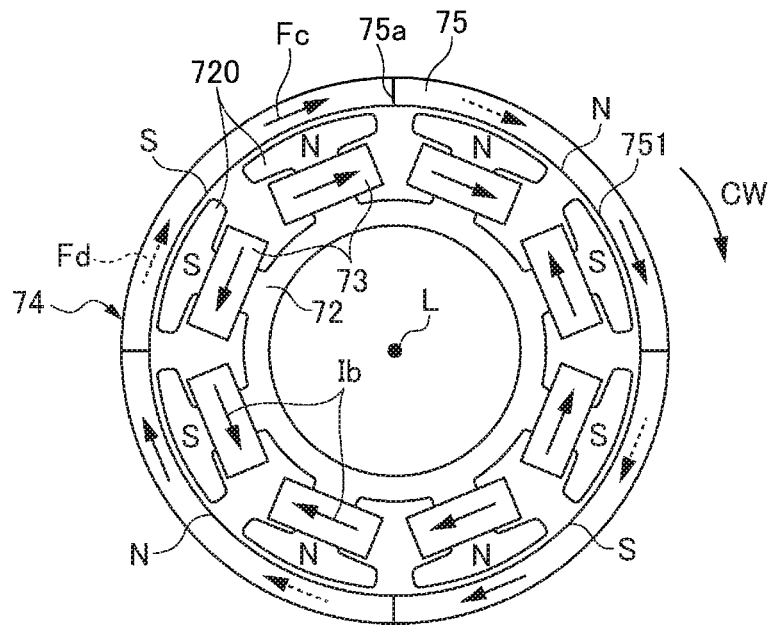
Figure 10A:
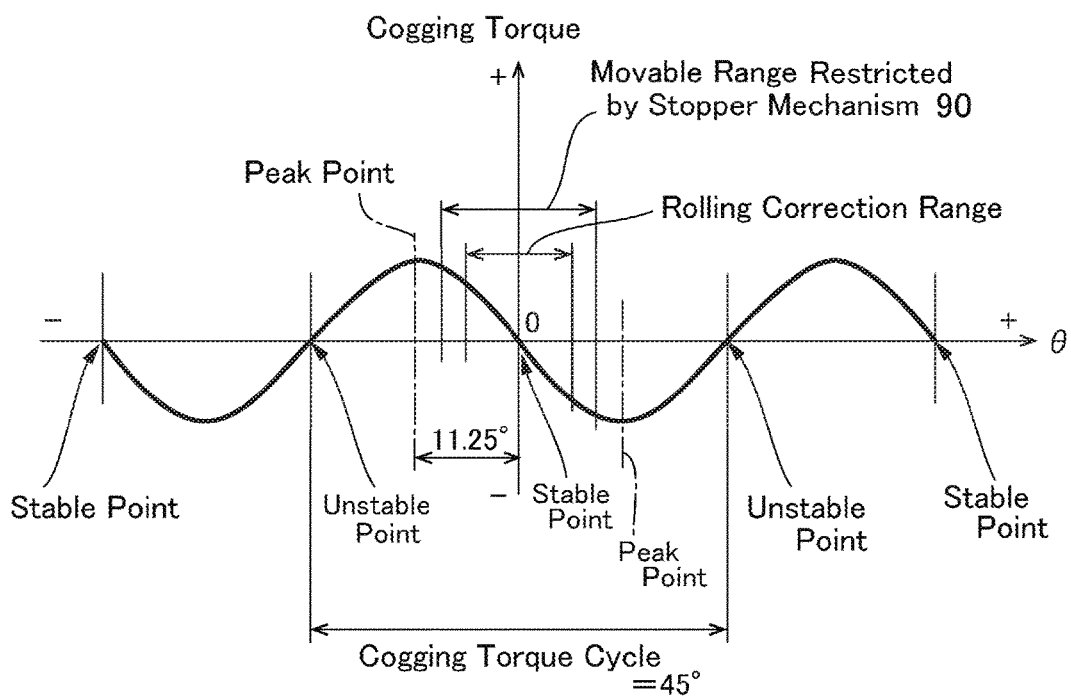
FIGS. 10A and 10B are explanatory views showing a cogging torque in a rolling drive mechanism (single phase motor).
Figure 10B:
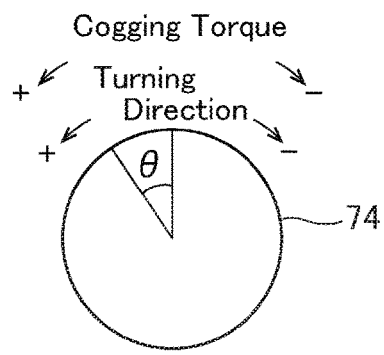

FIGS. 9A and 9B are explanatory views showing an operation of the rolling drive mechanism 70 (single phase motor 70A). FIG. 9A is an explanatory view showing a state that the rotor 74 is turned in a counterclockwise direction CCW and FIG. 9B is an explanatory view showing a state that the rotor 74 is turned in a clockwise direction CW. FIGS. 10A and 10B are explanatory views showing a cogging torque of the single phase motor 70A (rolling drive mechanism 70). FIG. 10A is a graph showing a relationship between an angle "θ" of the rotor 74 and its cogging torque and FIG. 10B is an explanatory view showing definitions of directions in the graph shown in FIG. 10A. A cogging torque shown in FIG. 10A is, as shown in FIG. 10B, a torque acting on the rotor 74 when the rotor 74 is held at a position turned by an angle "θ". The "θ" is indicated with "+" when the rotor 74 is turned in a counterclockwise direction and indicated with "−" when the rotor 74 is turned in a clockwise direction. The cogging torque is indicated with "+" when the rotor 74 is turned in the counterclockwise direction and indicated with "−" when the rotor 74 is turned in the clockwise direction.

In FIG. 10A, among points where the cogging torque becomes zero (0), a point where the cogging torque acts on the rotor 74 in a clockwise direction (direction of "−") when the rotor 74 is moved in a counterclockwise direction ("+" direction of "θ") and a point where the cogging torque acts on the rotor 74 in a counterclockwise direction (direction of "+") when the rotor 74 is moved in a clockwise direction ("−" direction of "θ") correspond to a "stable point" where a torque is generated so as to prevent the rotor 74 from turning in both directions in a circumferential direction. On the other hand, among the points where the cogging torque becomes zero (0), a point where the cogging torque acts on the rotor 74 in a counterclockwise direction (direction of "+") when the rotor 74 is moved in a counterclockwise direction ("+" direction of "θ") and a point where the cogging torque acts on the rotor 74 in the clockwise direction (direction of "−") when the rotor 74 is moved in the clockwise direction ("−" direction of "θ") correspond to an "unstable point" where a torque for turning the rotor 74 in both directions in a circumferential direction is generated.

In the rolling drive mechanism 70 (single phase motor 70A), the number of the salient poles 720 of the stator core 72 around each of which the stator coil 73 is wound is two (2) times of the number of the magnetic poles of the rotor magnet 75 (sum of the number of "S"-poles and the number of "N"-poles). In this embodiment, the number of the magnetic poles of the rotor magnet 75 is 4 and the number of the salient poles 720 is 8. Further, the salient poles 720 are provided at equal angular intervals in a circumferential direction. The stator coil 73 is structured so that one coil wire 730 is wound around a plurality of the salient poles 720 as shown by the arrows "C" in FIG. 8B.

The coil wire 730 is wound around a pair of two adjacent salient poles 720 in the same direction as each other and is wound in an opposite direction around an adjacent pair of two salient poles 720 to the pair of the two salient poles 720 in the clockwise direction CW. Further, in a stopped state of the rolling drive mechanism 70, in other words, when the rolling drive mechanism 70 is not driven, winding directions of the coil wire 730 are opposite to each other in two salient poles 720 facing one pole of the rotor magnet 75. Therefore, when an electric current is supplied to the coil wire 730, two salient poles 720 facing one pole of the rotor magnet 75 become reverse poles.

As shown in FIG. 9A, when the rotor 74 is to be turned in a counterclockwise direction CCW, an electric current as shown by the arrows "Ia" is supplied to the stator coils 73. As a result, one pole of the rotor magnet 75 is acted with an attraction force in the counterclockwise direction CCW shown by the arrow "Fa" of the solid line between one of two salient poles 720 and the one pole of the rotor magnet 75 and, on the other hand, a repulsive force in the counterclockwise direction CCW as shown by the arrow "Fb" of the dotted line is acted between the other of the two salient poles 720 and the one pole of the rotor magnet 75. Therefore, the rotor 74 is turned in the counterclockwise direction CCW and the unit 100 with a swing mechanism is turned in the counterclockwise direction CCW.

As shown in FIG. 9B, when the rotor 74 is to be turned in a clockwise direction CW, an electric current as shown by the arrows "Ib" is supplied to the stator coils 73. As a result, one pole of the rotor magnet 75 is acted with an attraction force in the clockwise direction CW shown by the arrow "Fc" of the solid line between one of two salient poles 720 and the one pole of the rotor magnet 75 and, on the other hand, a repulsive force in the clockwise direction CW as shown by the arrow "Fd" of the dotted line is acted between the other of the two salient poles 720 and the one pole of the rotor magnet 75. Therefore, the rotor 74 is turned in the clockwise direction CW and the unit 100 with a swing mechanism is also turned in the clockwise direction CW.

In the single phase motor 70A (rolling drive mechanism 70) structured as described above, in order to perform a rolling correction of the optical module 300 with a shake correction function, among a plurality of peak points of cogging torque, the rotor 74 is turned within an angular range interposed by adjacent two peak points of the cogging torque with the stable point as a center and thereby the unit 100 with a swing mechanism on which the optical module 1 is mounted is turned in a reciprocated manner. In this embodiment, the number of the magnetic poles of the rotor magnet 75 is 4 and the number of the salient poles 720 is 8 and thus, the cogging torque of the single phase motor 70A (rolling drive mechanism 70) is provided with a cycle of 45° as the cogging torque characteristic is shown in FIG. 10A. Therefore, the position where the cogging torque becomes the maximum value appears at a cycle of 22.5°. However, in order to perform a rolling correction, it is practically sufficient that the unit 100 with a swing mechanism on which the optical module 1 is mounted is turned in a range of about 12° (±6°). Therefore, according to the single phase motor 70A (rolling drive mechanism) in this embodiment, when a rolling correction of the optical unit 300 with a shake correction function is to be performed, the rotor 74 is turned in an angular range interposed by two peak points of the cogging torque which are adjacent to each other with a stable point as a center and thereby the unit 100 with a swing mechanism on which the optical module 1 is mounted can be turned in a reciprocated manner.

(Stopper Mechanism)

Figure 11:
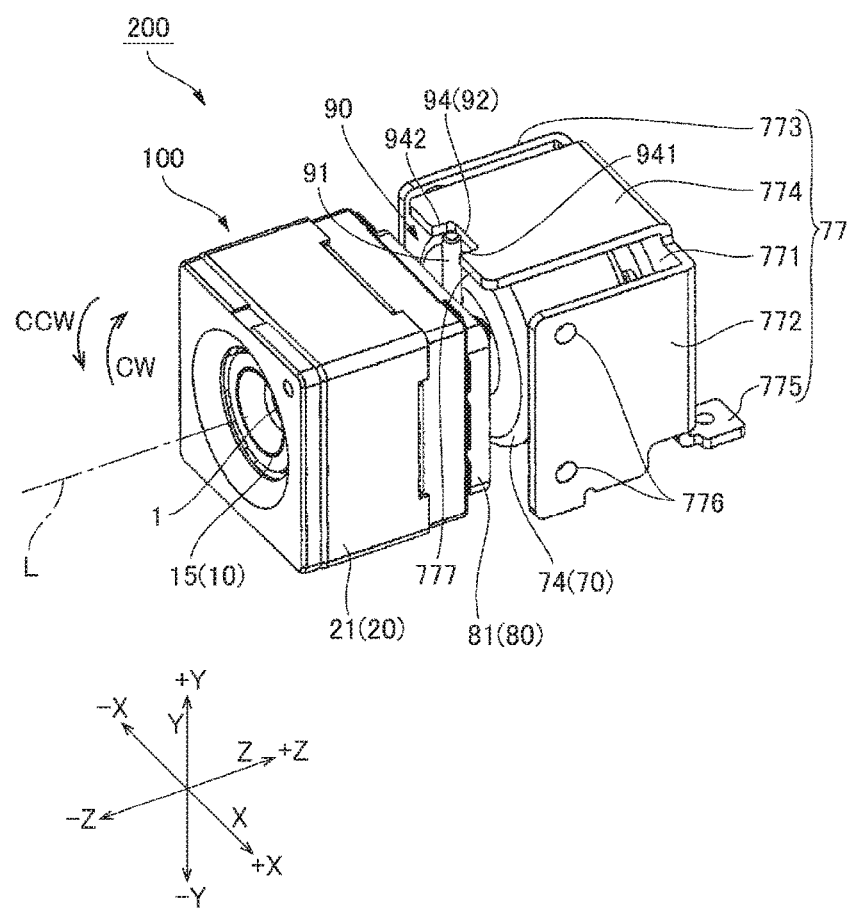
FIG. 11 is a perspective view showing an assembled body which is structured by assembling a unit with a swing mechanism, a connection member, a rolling drive mechanism and a support member.
Figure 12:
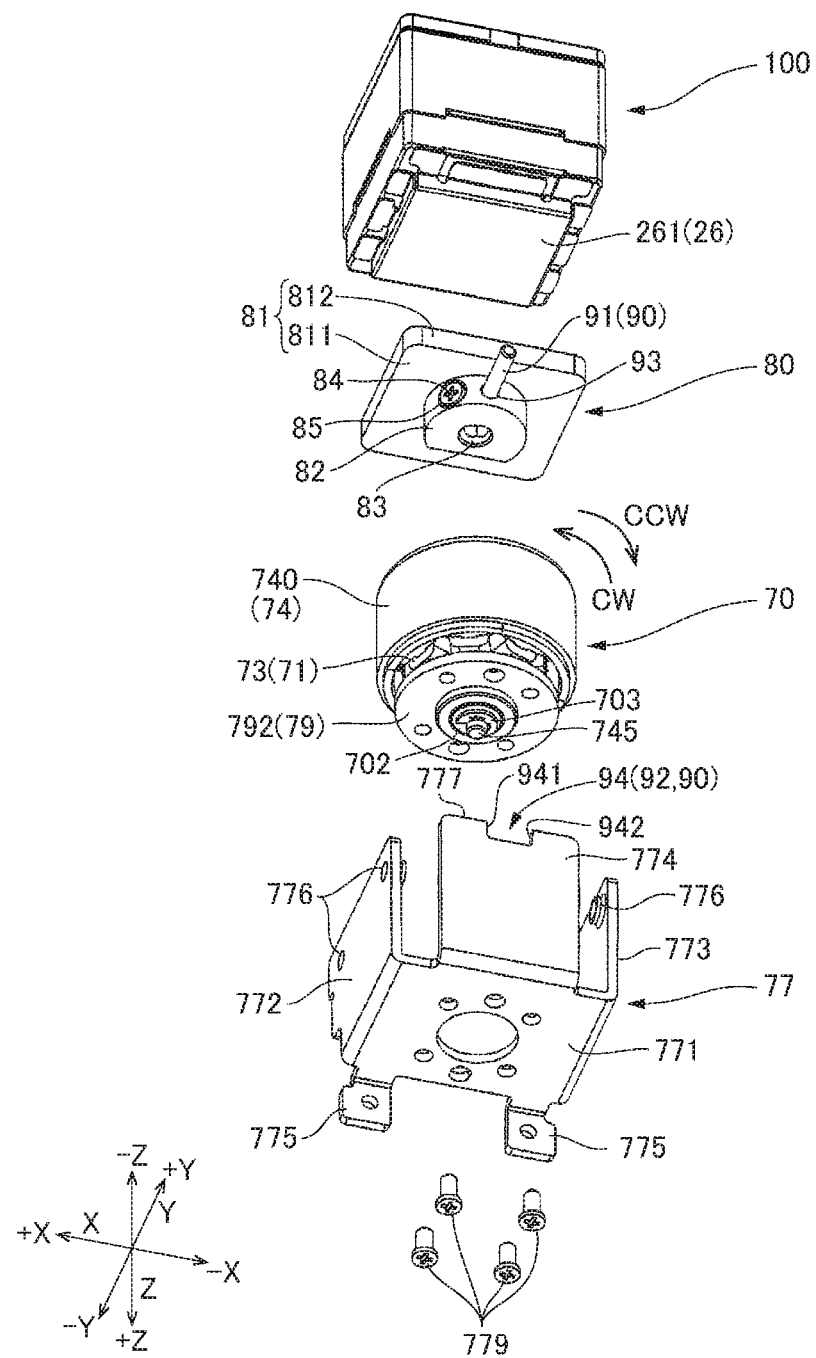
FIG. 12 is an exploded perspective view showing a unit with a swing mechanism, a connection member, a rolling drive mechanism and a support member which are viewed from an image side.

FIG. 11 is a perspective view showing an assembled body 200 which is structured by assembling the unit 100 with a swing mechanism, the connection member 80, the rolling drive mechanism 70 and the support member 77. In FIG. 11, the flexible circuit boards 18 and 19 are not shown. FIG. 12 is an exploded perspective view showing the unit 100 with a swing mechanism, the connection member 80, the rolling drive mechanism 70 and the support member 77 which are viewed from an image side. The optical unit 300 with a shake correction function includes a stopper mechanism 90 structured to restrict a turnable range around the optical axis "L" of the unit 100 with a swing mechanism on which the optical module 1 is mounted. As described above, the unit 100 with a swing mechanism is fixed to the turning shaft 745 (rotor 74) of the single phase motor 70A (rolling drive mechanism 70) through the connection member 80 and is integrally turned together with the turning shaft 745 (rotor 74). On the other hand, the stator 71 of the single phase motor 70A (rolling drive mechanism 70) is fixed to the support member 77 through the bearing holder 79 and the support member 77 is fixed to the unit case 310. The stopper mechanism 90 is structured between the support member 77 and the connection member 80.

The connection member 80 is provided with a holding part 81 which holds the unit 100 with a swing mechanism. The holding part 81 is provided with a rectangular bottom plate part 811 and a frame part 812 protruded from an outer circumferential edge of the bottom plate part 811 to the other side "−Z" in the "Z"-axis direction, i.e., to a side of the unit 100 with a swing mechanism. A rectangular protruded part 261 which is located at an end part on one side "+Z" in the "Z"-axis direction of the unit 100 with a swing mechanism and is protruded from the second bottom plate 26 is disposed on an inner side of the frame part 812.

As shown in FIGS. 4 and 12, the connection member 80 is provided with a cylindrical tube part 82 which is protruded from the center of the holding part 81 to one side "+Z" in the "Z"-axis direction, in other words, from the bottom plate part 811 to the turning shaft 745 side. The cylindrical tube part 82 is formed in a "D"-cut shape in which a part of its outer peripheral face is cut in a flat face. The connection member 80 is formed with an attaching hole 83 which penetrates through the cylindrical tube part 82 and the bottom plate part 811 in the "Z"-axis direction, and a tip end of the turning shaft 745 fitted into the attaching hole 83 is fixed to the connection member 80 by a set screw 84. The set screw 84 is attached to a screw hole 85 which penetrates through the cylindrical tube part 82 in a radial direction. The screw hole 85 is opened on an inner peripheral face of the attaching hole 83 and a tip end of the set screw 84 is abutted with an outer peripheral face of the turning shaft 745.

The stopper mechanism 90 includes an abutting part 91 provided in the connection member 80 and a position restriction part 92 provided in the support member 77. The abutting part 91 is a protruded part which is protruded from an outer peripheral face of the cylindrical tube part 82 of the connection member 80 to an outer side in a radial direction. In this embodiment, the abutting part 91 is structured of a bar-shaped member (pin) which is fixed to an attaching hole 93 formed in the cylindrical tube part 82 by press fitting. The abutting part 91 is formed with a resin layer on its surface. The resin layer may be provided on the entire surface of the abutting part 91 or may be provided on only a portion which is to be abutted with the position restriction part 92. Alternatively, the entire abutting part 91 may be formed of resin. Further, the abutting part 91 may be integrally formed with the connection member 80. The position restriction part 92 restricts a turnable range around the optical axis "L" of the abutting part 91. The position restriction part 92 is formed in the side plate part 774 of the support member 77. In three side plate parts 772, 773 and 774 surrounding the rotor 74, the side plate part 774 is provided at an angular position where the abutting part 91 is protruded.

The side plate part 774 is formed in a flat plate shape and an edge part 777 on the other side "−Z" in the "Z"-axis direction is extended in a straight line shape in the "X"-axis direction. The position restriction part 92 is a rectangular cut-out part 94 which is formed at a center in the "X"-axis direction of the edge part 777. A tip end of the abutting part 91 is disposed in the cut-out part 94. The cut-out part 94 is provided with a first edge part 941 located on one side "+X" in the "X"-axis direction with respect to a tip end of the abutting part 91 and a second edge part 942 located on the other side "−X" in the "X"-axis direction with respect to the tip end of the abutting part 91.

When the unit 100 with a swing mechanism is turned to one side around the optical axis "L", in other words, when the unit 100 is turned in a clockwise direction CW in FIGS. 11 and 12, the abutting part 91 is integrally turned together with the unit 100 with a swing mechanism and the tip end of the abutting part 91 is abutted with the first edge part 941 of the cut-out part 94. As a result, a movable range in the clockwise direction CW of the unit 100 with a swing mechanism is restricted. Further, when the unit 100 with a swing mechanism is turned to the other side around the optical axis "L", in other words, when the unit 100 is turned in a counterclockwise direction CCW in FIGS. 11 and 12, the tip end of the abutting part 91 is abutted with the second edge part 942 of the cut-out part 94. As a result, a movable range in the counterclockwise direction CCW of the unit 100 with a swing mechanism is restricted.

A turnable range (movable range) of the unit 100 with a swing mechanism which is restricted by the stopper mechanism 90 is, as shown in FIG. 10A, wider than the rolling correction range and narrower than an angular range interposed by adjacent peak points of the cogging torque. Therefore, the unit 100 with a swing mechanism can be prevented from being turned excessively by a torque applied from the outside. Further, in the stopper mechanism 90, the abutting part 91 in a bar shape provided in the connection member 80 is abutted with the first edge part 941 or the second edge part 942 of the cut-out part 94 formed in the support member 77 and thereby the turnable range of the unit 100 with a swing mechanism is restricted. Therefore, even when the assembled body 200 is not attached to the unit case 310, the turnable range of the unit 100 with a swing mechanism is restricted by the stopper mechanism 90 in a state of only the assembled body 200.

Figure 13:
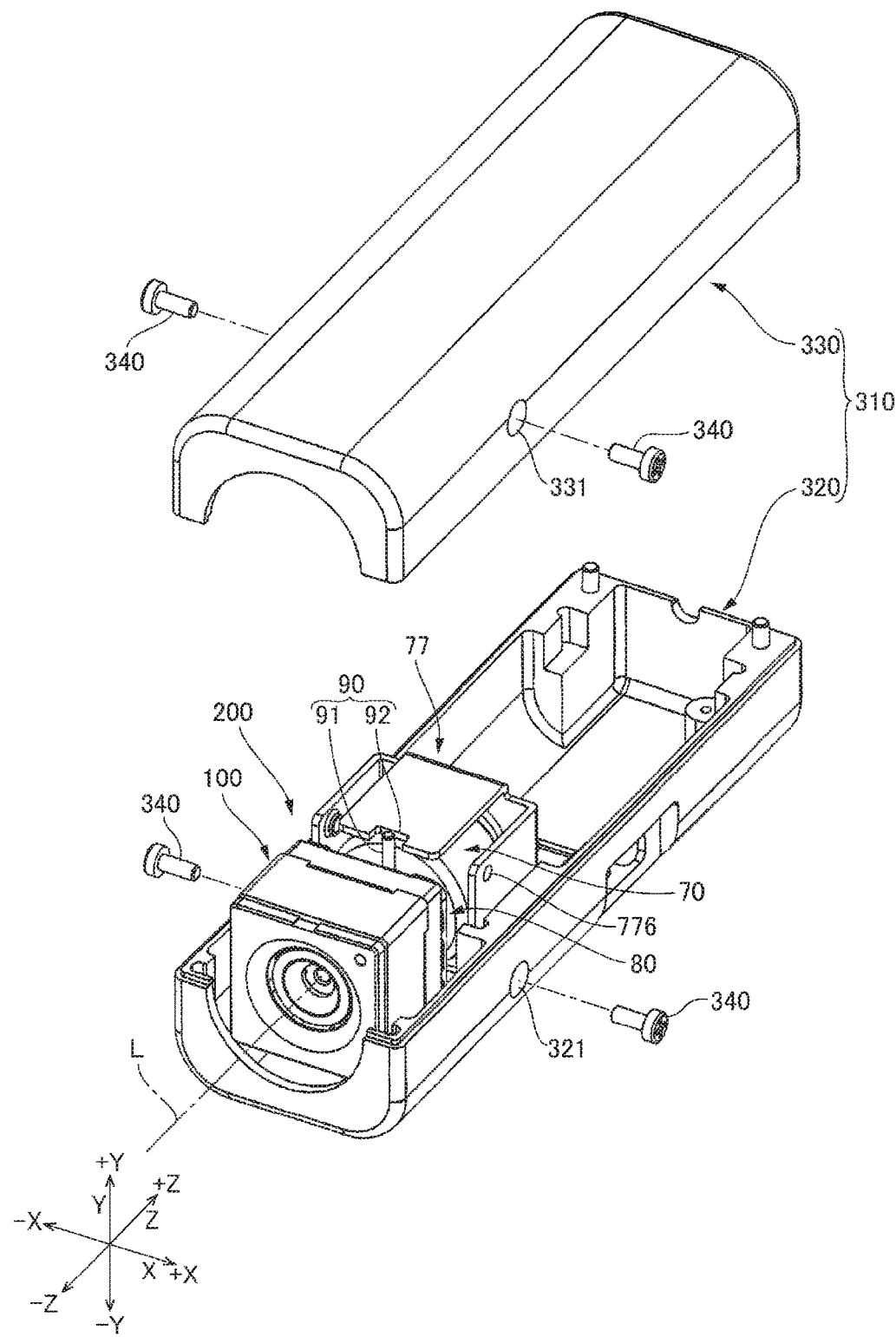
FIG. 13 is an explanatory view showing an assembled body in FIG. 11 and a unit case.

FIG. 13 is an explanatory view showing the assembled body 200 in FIG. 11 and the unit case 310. As shown in FIG. 13, the assembled body 200 which is structured by assembling the unit 100 with a swing mechanism, the connection member 80, the rolling drive mechanism 70 and the support member 77 is fixed to the first case member 320 and the second case member 330 by the screws 340. As shown in FIG. 4, the side plate parts 772 and 773 of the support member 77 are respectively formed with two fixed holes 776. The fixed holes 776 are formed at positions overlapped with the fixed hole 321 of the first case member 320 and the fixed hole 331 of the second case member 330. When the screws 340 are attached to the fixed holes 321 and 776, the support member 77 is fixed to the first case member 320. Further, when the screws 340 are attached to the fixed holes 331 and 776, the support member 77 is fixed to the second case member 330.

As shown in FIG. 13, when the assembled body 200 is incorporated in the first case member 320 in a state that an inner face of the first case member 320 faces upward, the side plate part 774 of the support member 77 is located to an upper side of the rotor 74 to structure an upper face side of the assembled body 200. As shown in FIGS. 11 and 13, when the assembled body 200 is disposed in a posture that the side plate part 774 provided with the stopper mechanism 90 is located on an upper side and the side plate parts 772 and 773 are disposed on right and left sides, the stopper mechanism 90 is easily observed from a worker. Therefore, when a turning position around the optical axis "L" of the unit 100 with a swing mechanism is adjusted in this posture, a movable range of the abutting part 91 is easily observed through the cut-out part 94 and thus the adjusting work is easily performed.

(Principal Effects in this Embodiment)

As described above, the optical unit 300 with a shake correction function in this embodiment includes the connection member 80 which connects the unit 100 with a swing mechanism with the turning shaft 745 of the rolling drive mechanism 70 and the support member 77 which supports the rolling drive mechanism 70, and the stopper mechanism 90 is structured between the support member 77 and the connection member 80 by using the abutting part 91 and the position restriction part 92. According to this structure, the optical module 1 can be prevented from being excessively turned by a force applied from the outside. Further, the abutting part 91 and the position restriction part 92 function as the stopper mechanism 90 in a state that the assembled body 200 has been structured by assembling the unit 100 with a swing mechanism having the optical module 1, the rolling drive mechanism 70, the connection member 80 and the support member 77. Therefore, before these mechanisms are assembled into the unit case 310, an inspection can be performed on the assembled body 200 to eliminate a defective product.

In this embodiment, two directions perpendicular to an axial line direction of the turning shaft 745 ("Z"-axis direction) are the "X"-axis direction (first direction) and the "Y"-axis direction (second direction), and the support member 77 is provided with the side plate parts 772 and 773 located on both sides in the "X"-axis direction (first direction) of the rolling drive mechanism 70 and the side plate part 774 located on one side "+Y" in the "Y"-axis direction (second direction). Further, among the three side plate parts, the side plate part 774 located at a position corresponding to the abutting part 91 is provided with the position restriction part 92. According to this structure, the stopper mechanism 90 is structured by utilizing the side plate part 774 located on an outer peripheral side of the rolling drive mechanism 70. Therefore, since the stopper mechanism 90 can be provided at an open position, assembling work and adjustment work are easily performed. Further, the stopper mechanism 90 can be structured by utilizing one of the side plate parts 772, 773 and 774 which protect the rolling drive mechanism 70. Since the side plate parts 772, 773 and 774 are formed in a flat plate shape, the side plate parts 772, 773 and 774 can be utilized as an attaching part to another member such as the unit case 310. In accordance with an embodiment of the present invention, it may be structured that, instead of the side plate part 774, one of the side plate parts 772 and 773 is disposed at a position corresponding to the abutting part 91 to structure the position restriction part 92. Further, among the side plate parts 772, 773 and 774, the side plate parts having no position restriction part 92 may be omitted.

In this embodiment, the abutting part 91 is a protruded part provided in the connection member 80 and the position restriction part 92 is a cut-out part 94 provided at an edge of the side plate part 774. According to this structure, the protruded part (abutting part 91) is disposed in the cut-out part 94 and thus a movable range of the protruded part (abutting part 91) can be restricted by the first edge part 941 and the second edge part 942 of the cut-out part 94. According to this structure, a movable range of the protruded part (abutting part 91) can be easily confirmed and thus assembling and adjustment are easily performed.

In this embodiment, the control part 350 for controlling the unit 100 with a swing mechanism is provided, and the unit 100 with a swing mechanism is located on one side in an axial line direction of the turning shaft 745 ("Z"-axis direction) with respect to the rolling drive mechanism 70 and the control part 350 is located on the other side, and the unit 100 with a swing mechanism and the control part 350 are connected with each other through the flexible circuit boards 18, 19 and 353. According to this structure, as shown in FIG. 3, the flexible circuit boards 18 and 19 can be extended along the side plate part 774. When the flexible circuit boards 18 and 19 are extended along an outer side face of the side plate part 774, the rolling drive mechanism 70 and the flexible circuit boards 18 and 19 can be avoided from contacting with each other. In this case, the cut-out part 94 as the position restriction part 92 provided at an upper edge of the side plate part 774 is located between the flexible circuit boards 18 and 19, and the bar-shaped member (pin) as the abutting part 91 is also located between the flexible circuit boards 18 and 19. In other words, the flexible circuit boards 18 and 19 are disposed at a position where the flexible circuit boards 18 and 19 are not interfered with the bar-shaped member (pin) as the abutting part 91. Further, the side plate part 774 can be disposed between the flexible circuit boards 18 and 19 and the rolling drive mechanism 70 (single phase motor 70A) which is a magnetic drive mechanism. Therefore, for example, when the support member 77 is structured of magnetic material, signals passing through the flexible circuit boards 18 and 19 may be hard to be affected by magnetic noise generated from the magnetic drive mechanism.

In this embodiment, the surface of the abutting part 91 or the entire abutting part 91 is made of resin and thus a contact noise when the abutting part 91 and the position restriction part 92 are abutted with each other can be reduced.

In this embodiment, a magnetic drive mechanism of the rolling drive mechanism 70 is a single phase motor 70A. The single phase motor 70A utilizes an attraction force and a repulsive force by the rotor magnet 75 and thus, in comparison with a case that Lorentz force is utilized, a large torque can be obtained.

In this embodiment, the rolling drive mechanism 70 (single phase motor 70A) reciprocatedly turns the unit 100 with a swing mechanism within an angular range interposed by adjacent two peak points of the cogging torque with the stable point as a center among a plurality of peak points of the cogging torque. Further, a turnable range (movable range) of the unit 100 with a swing mechanism restricted by the stopper mechanism 90 structured of the abutting part 91 and the position restriction part 92 is narrower than the angular range interposed by adjacent two peak points of the cogging torque. According to this structure, the single phase motor 70A is not required to apply a torque exceeding a ripple of the cogging torque to the unit 100 with a swing mechanism on which the optical module 1 is mounted. Therefore, power saving of the single phase motor 70A can be attained. Further, the cogging torque applied to the unit 100 with a swing mechanism on which the optical module 1 is mounted can be utilized as a magnetic spring for returning the unit 100 with a swing mechanism to a reference position around the optical axis "L". Therefore, a mechanical spring is not required to provide separately.

In this embodiment, the connection member 80 is provided with the attaching hole 83 into which the turning shaft 745 is inserted, and the connection member 80 is fixed to the turning shaft 745 by the set screw 84 attached to the screw hole 85 which is opened to an inner peripheral face of the attaching hole 83. According to this structure, adjustments of an attaching position and an attaching angle of the connection member 80 with respect to the turning shaft 745 can be performed easily. In accordance with an embodiment of the present invention, the attaching hole 83 may be a recessed part other than a through-hole.

In this embodiment, the unit case 310 is provided which accommodates the unit 100 with a swing mechanism, the connection member 80, the rolling drive mechanism 70 and the support member 77, and the assembled body 200 which is structured by assembling the unit 100 with a swing mechanism, the connection member 80, the rolling drive mechanism 70 and the support member 77 is fixed to the unit case 310 through the support member 77. According to this structure, the assembled body 200 which is structured by assembling the unit 100 with a swing mechanism, the connection member 80, the rolling drive mechanism 70 and the support member 77 is completed and inspected and, after that, the assembled body 200 can be fixed to the unit case 310 through the support member 77. Therefore, the internal mechanisms of the optical unit 300 with a shake correction function can be easily assembled in the unit case 310.

MODIFIED EMBODIMENTS

Figure 14A:
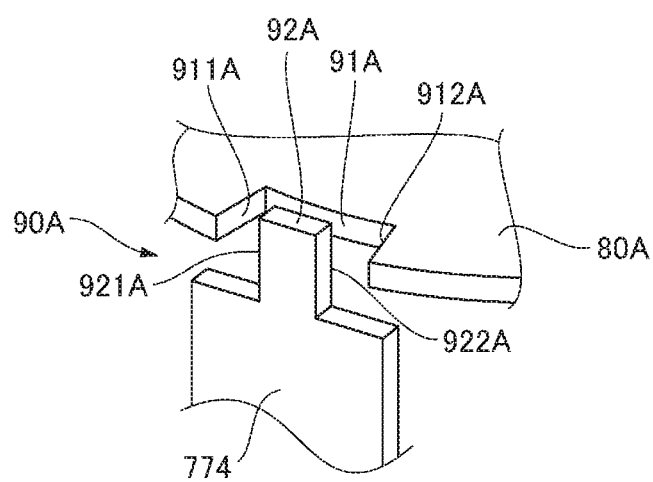
FIGS. 14A and 14B are explanatory views showing modified embodiments of a stopper mechanism.
Figure 14B:
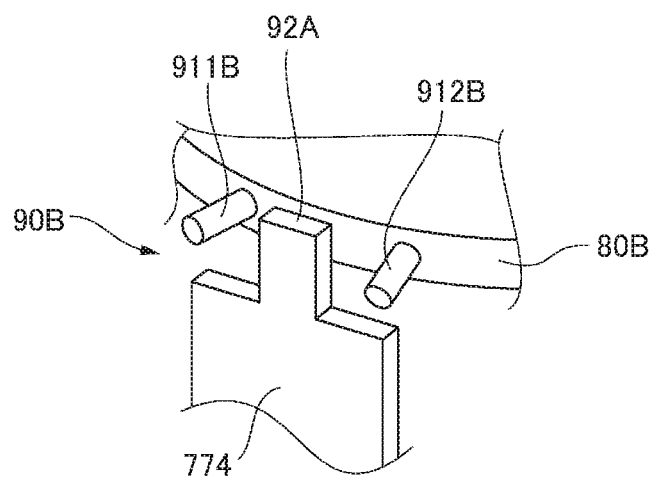

FIGS. 14A and 14B are explanatory views showing a first and a second modified embodiments of the stopper mechanism. In the embodiment described above, the abutting part 91 is a protruded part (bar-shaped member) and the position restriction part 92 is a cut-out part. However, in a stopper mechanism 90A in a first modified embodiment shown in FIG. 14A, the abutting part 91A provided in the connection member 80A is a cut-out part (recessed part) and the position restriction part 92A provided in the side plate part 774A is a protruded part (projection). In a case that the position restriction part 92 is a protruded part (projection), side faces 921A and 922A on both sides in a width direction of the protruded part are respectively capable of abutting with edges 911A and 912A on both sides in a width direction of the abutting part 91A (cut-out part (recessed part)) to restrict a turnable range of the connection member 80A. Further, like a stopper mechanism 90B in a second modified embodiment shown in FIG. 14B, protruded parts 911B and 912B such as a bar-shaped member provided at two positions separated in a turning direction of the connection member 80B may be used as the abutting part 91B. In this case, a portion between the protruded parts 911B and 912B may be regarded as a recessed part.

In the embodiment described above, the surface or the whole of the abutting part 91 is formed of resin. However, one or both of an abutting portion of the abutting part 91 with the position restriction part 92 and an abutting portion of the position restriction part 92 with the abutting part 91 may be formed of resin. For example, portions of the position restriction part 92 in the embodiment described above which are to be abutted with the abutting part 91, in other words, the first edge part 941 and the second edge part 942 may be formed of resin. For example, a resin frame may be attached to an inner peripheral edge of the cut-out part 94. Further, a part of the abutting part 91 may be formed of resin by fixing a ring-shaped resin ring to the abutting part 91.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
   a unit with a swing mechanism comprising:
      an optical module which is swingably supported; and
      a swing drive mechanism structured to swing the optical module;
   a rolling drive mechanism comprising a magnetic drive mechanism structured to turn the unit with the swing mechanism in a direction different from a swing direction by the swing drive mechanism;
   a connection member which connects the unit with the swing mechanism with a turning shaft of the rolling drive mechanism; and
   a support member which supports the rolling drive mechanism,
   wherein the connection member comprises an abutting part integrally turned with the unit with the swing mechanism and the support member comprises a position restriction part which restricts a movable range of the abutting part;
   in a case that two directions perpendicular to an axial line direction of the turning shaft are referred to as a first direction and a second direction,
   the support member comprises at least one side plate part located in at least one direction on both sides in the first direction and on both sides in the second direction of the rolling drive mechanism, and
   the position restriction part is provided in the side plate part provided at a position corresponding to the abutting part.

2. The optical unit with a shake correction function according to claim 1, wherein the side plate part is formed in a flat plate shape.

3. The optical unit with a shake correction function according to claim 1, wherein
   the abutting part is one of a protruded part and a recessed part provided in the connection member, and
   the position restriction part is a cut-out part which is engageable with the protruded part as the abutting part and is provided in an edge of the side plate part, or a projection which is engageable with the recessed part as the abutting part and is provided in the edge of the side plate part.

4. The optical unit with a shake correction function according to claim 1, wherein
   the connection member comprises a holding part which holds the unit with the swing mechanism,
   the holding part comprises a bottom plate part and a frame part protruding from the bottom plate part to a side of the unit with the swing mechanism,
   the unit with the swing mechanism is disposed on an inner side of the frame part, and
   the abutting part is integrally provided in the frame part.

5. The optical unit with a shake correction function according to claim 4, wherein
   the magnetic drive mechanism of the rolling drive mechanism is a single phase motor,
   the single phase motor comprises:
      a turning shaft as the turning shaft of the rolling drive mechanism which is turnably supported by a bearing held by a bearing holder;
      a rotor which is attached to the turning shaft; and
      a stator which is held by the bearing holder,
   the support member comprises a bottom plate part to which the bearing holder is fixed and the side plate part which is bent from the bottom plate part, and
   an end face of the side plate part is provided with the position restriction part which is structured to abut with the abutting part.

6. The optical unit with a shake correction function according to claim 1, further comprising a control part structured to control the unit with the swing mechanism,
   wherein the unit with the swing mechanism is located on one side in an axial line direction of the turning shaft with respect to the rolling drive mechanism, and the control part is located on the other side, and
   wherein the unit with the swing mechanism and the control part are connected with each other through a flexible circuit board.

7. The optical unit with a shake correction function according to claim 1, wherein at least one of a portion of the abutting part which is structured to abut with the position restriction part and a portion of the position restriction part which is structured to abut with the abutting part is made of resin.

8. The optical unit with a shake correction function according to claim 1, wherein the magnetic drive mechanism is a single phase motor.

9. The optical unit with a shake correction function according to claim 8, wherein
   the single phase motor is an outer rotor type single phase motor, and
   a number of salient poles of a stator core of the single phase motor is two times of a number of magnetic poles of a rotor magnet.

10. The optical unit with a shake correction function according to claim 8, wherein the single phase motor is structured to reciprocatedly turn the unit with the swing mechanism within an angular range interposed by adjacent two peak points of a cogging torque with a stable point as a center.

11. The optical unit with a shake correction function according to claim 10, wherein a movable range of the unit with the swing mechanism determined by the abutting part and the position restriction part is narrower than the angular range interposed by the adjacent two peak points of the cogging torque.

12. The optical unit with a shake correction function according to claim 1, wherein
   the connection member comprises a hole or a recessed part into which the turning shaft is inserted, and
   the connection member is fixed to the turning shaft by a screw attached to a screw hole which is opened to an inner peripheral face of the hole or the recessed part.

13. The optical unit with a shake correction function according to claim 12, wherein
   the connection member comprises a holding part which holds the unit with the swing mechanism,
   the holding part comprises a bottom plate part, a frame part which is protruded from the bottom plate part to a side of the unit with the swing mechanism, and a cylindrical tube part which is protruded from the bottom plate part to a side of the turning shaft,
   the unit with the swing mechanism is disposed on an inner side of the frame part,
   the cylindrical tube part is provided with the hole or the recessed part into which the turning shaft is inserted, and
   the cylindrical tube part is provided with the abutting part.

14. The optical unit with a shake correction function according to claim 1, further comprising a unit case which accommodates the unit with the swing mechanism, the connection member, the rolling drive mechanism and the support member,
- wherein an assembled body which is structured by assembling the rolling drive mechanism, the unit with the swing mechanism, the connection member and the support member is fixed to the unit case through the support member.

15. The optical unit with a shake correction function according to claim 14, further comprising a control part structured to control the unit with the swing mechanism,
- wherein the unit with the swing mechanism is located on one side in an axial line direction of the turning shaft with respect to the rolling drive mechanism, and the control part is located on the other side, and
- wherein the unit with the swing mechanism and the control part are connected with each other through a flexible circuit board.

16. The optical unit with a shake correction function according to claim 14, wherein at least one of a portion of the abutting part which is structured to abut with the position restriction part and a portion of the position restriction part which is structured to abut with the abutting part is made of resin.

17. An optical unit with a shake correction function comprising:
- a unit with a swing mechanism comprising:
  - an optical module which is swingably supported; and
  - a swing drive mechanism structured to swing the optical module;
- a rolling drive mechanism comprising a magnetic drive mechanism structured to turn the unit with the swing mechanism in a direction different from a swing direction by the swing drive mechanism;
- a connection member which connects the unit with the swing mechanism with a turning shaft of the rolling drive mechanism; and
- a support member which supports the rolling drive mechanism,
- wherein the connection member comprises an abutting part integrally turned with the unit with the swing mechanism and the support member comprises a position restriction part which restricts a movable range of the abutting part;
- the magnetic drive mechanism is a single phase motor; and
- the single phase motor is structured to reciprocatedly turn the unit with the swing mechanism within an angular range interposed by adjacent two peak points of a cogging torque with a stable point as a center.

* * * * *